United States Patent
Ide et al.

(10) Patent No.: US 9,624,022 B2
(45) Date of Patent: Apr. 18, 2017

(54) STORAGE CONTAINER UTILIZING TWO DIFFERENT HEAT INSULATING MATERIALS IN COMBINATION WITH A TEMPERATURE CONTROL UNIT AND A HEAT STORAGE MATERIAL PLACED WITHIN THE CONTAINER

(75) Inventors: Tetsuya Ide, Osaka (JP); Yuka Utsumi, Osaka (JP); Yasuyuki Umenaka, Osaka (JP); Takashi Yamashita, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 414 days.

(21) Appl. No.: 14/110,239

(22) PCT Filed: Apr. 5, 2012

(86) PCT No.: PCT/JP2012/059392
§ 371 (c)(1),
(2), (4) Date: Oct. 7, 2013

(87) PCT Pub. No.: WO2012/137878
PCT Pub. Date: Oct. 11, 2012

(65) Prior Publication Data
US 2014/0033759 A1 Feb. 6, 2014

(30) Foreign Application Priority Data
Apr. 8, 2011 (JP) .................. 2011-086668

(51) Int. Cl.
*F25D 3/08* (2006.01)
*F25D 23/00* (2006.01)
(Continued)

(52) U.S. Cl.
CPC ........... *B65D 81/3823* (2013.01); *F25D 3/00* (2013.01); *F25D 11/006* (2013.01);
(Continued)

(58) Field of Classification Search
CPC .............. B65D 81/3823; F25D 11/006; F25D 2201/14; F25D 23/062; F25D 3/00; F25D 3/005; F25D 2303/0843; Y02B 40/34
(Continued)

(56) References Cited

U.S. PATENT DOCUMENTS

| | | | | |
|---|---|---|---|---|
| 4,726,974 A | * | 2/1988 | Nowobilski | ............ B32B 15/08 428/219 |
| 6,128,914 A | * | 10/2000 | Tamaoki | ................. F25B 9/006 312/401 |

(Continued)

FOREIGN PATENT DOCUMENTS

| | | |
|---|---|---|
| JP | 06-194031 A | 7/1994 |
| JP | 10-205994 A | 8/1998 |

(Continued)

OTHER PUBLICATIONS

Official Communication issued in International Patent Application No. PCT/JP2012/059392, mailed on Jul. 17, 2012.

*Primary Examiner* — Allen Flanigan
*Assistant Examiner* — Filip Zec
(74) *Attorney, Agent, or Firm* — Keating & Bennett, LLP

(57) ABSTRACT

Performance of heat insulation between the outside of a storage container and the inside of a storage chamber is effectively improved. The storage container includes a container body having an opening, a door member closing the opening in an openable and closable manner, and a temperature-controlled unit having a function of making a temperature inside a storage chamber 2 enclosed by the container body and the door member be different from a temperature outside the storage chamber. The container body includes a first heat-insulating material 14, a second heat-insulating material 15 which is provided partially on the opposite side to the storage chamber 2 with respect to the first heat-insulating material 14 and has thermal conductivity (Continued)

lower than that of the first heat-insulating material 14, and a heat-storage material 16 which is provided at least partially in a region where the second heat-insulating material 15 is not provided as viewed from a thickness direction of the first heat-insulating material 14 on the same side as the storage chamber 2 with respect to the first heat-insulating material 14 and is formed of one or more kinds of raw material where phase transition is caused between a liquid phase and a solid phase at a temperature between the temperature outside the storage chamber 2 and the temperature inside the storage chamber 2 obtained by the function of the temperature-controlled unit.

25 Claims, 11 Drawing Sheets

(51) Int. Cl.
| | |
|---|---|
| *B65D 81/38* | (2006.01) |
| *B65D 83/72* | (2006.01) |
| *F25D 23/06* | (2006.01) |
| *F25D 3/00* | (2006.01) |
| *F25D 11/00* | (2006.01) |

(52) U.S. Cl.
CPC ........ *F25D 23/062* (2013.01); *F25D 2201/14* (2013.01); *Y02B 40/34* (2013.01)

(58) Field of Classification Search
USPC .................. 220/592.09, 592.26, 592.27
See application file for complete search history.

(56) References Cited

U.S. PATENT DOCUMENTS

| | | | | |
|---|---|---|---|---|
| 6,164,030 A | * | 12/2000 | Dietrich | F16L 59/12 52/406.2 |
| 6,266,972 B1 | * | 7/2001 | Bostic | F25D 3/06 62/371 |
| 6,482,332 B1 | * | 11/2002 | Malach | C09K 5/066 165/10 |
| 7,210,308 B2 | * | 5/2007 | Tanimoto | B65D 81/18 220/592.02 |
| 7,299,652 B2 | * | 11/2007 | Gagnon | B65D 81/3818 62/371 |
| 7,316,125 B2 | * | 1/2008 | Uekado | F25D 23/062 312/404 |
| 7,412,846 B2 | * | 8/2008 | Sekiya | B65D 79/02 62/371 |

FOREIGN PATENT DOCUMENTS

| | | |
|---|---|---|
| JP | 2002-162147 A | 6/2002 |
| JP | 2006-242439 A | 9/2006 |
| JP | 2007-240021 A | 9/2007 |
| JP | 2009-299764 A | 12/2009 |

* cited by examiner

STORAGE CONTAINER UTILIZING TWO DIFFERENT HEAT INSULATING MATERIALS IN COMBINATION WITH A TEMPERATURE CONTROL UNIT AND A HEAT STORAGE MATERIAL PLACED WITHIN THE CONTAINER

TECHNICAL FIELD

The present invention relates to a storage container.

BACKGROUND ART

Storage containers such as refrigerators and heating cabinets can store a material stored in a storage chamber thereof at a desired temperature different from a temperature of outside air such as a living temperature. For example, a refrigerator can maintain freshness of a stored material such as various foods for a long time. In addition, a heating cabinet can maintain a stored material such as various foods at a ready-to-eat temperature (for example, 80° C.) or the like.

A storage container is expected to improve performance of heat insulation between the inside and outside of the storage chamber. Generally, a wall portion separating the outside of the storage container and the inside of the storage chamber is composed of a heat-insulating material such as foamed urethane. A part of the wall portion may be composed of a second heat-insulating material of which thermal conductivity is lower than that of foamed urethane or the like, so as to improve the heat insulating performance of the storage container. As the second heat-insulating material, for example, a vacuum heat-insulating material disclosed in PTL 1 may be exemplified.

The vacuum heat-insulating material has, for example, a plate-shaped porous base material and an exterior body accommodating the base material, a pressure in the inside of the exterior body being reduced to a high vacuum. The exterior body has a structure in which films covering the front and back surfaces of the base material are welded or bonded to each other in the outside of an outer periphery of the base material. In the vacuum heat-insulating material, thermal conductivity inside thereof is extremely low by reducing a pressure in the inside thereof and, for example, the thermal conductivity is approximately $\frac{1}{20}$ compared to the heat-insulating material such as foamed urethane.

CITATION LIST

Patent Literature

PTL 1: Japanese Unexamined Patent Application Publication No. 2009-299764

SUMMARY OF INVENTION

Technical Problem

However, for example, it is not easy to perform bending or the like on the second heat-insulating material composed of the vacuum heat-insulating material or the like and may be difficult for the second heat-insulating material to be disposed in a whole region of the wall portion of the storage chamber without a gap. Since the heat insulating performance is not improved in a portion where the second heat-insulating material is not disposed, there is a room for improvement in performance of the heat insulation between the outside of the storage container and the inside of the storage chamber in the storage container of the related art.

The invention is made in view of the circumstances described above and an object of the invention is to effectively improve performance of the heat insulation between the outside of the storage container and the inside of the storage chamber.

Solution to Problem

A storage container of a first aspect of the invention includes: a container body having an opening; a door member closing the opening in an openable and closable manner; and a temperature-controlled unit having a function of making a temperature inside a storage chamber enclosed by the container body and the door member be different from a temperature outside the storage chamber. The container body includes a first heat-insulating material, a second heat-insulating material which is provided partially on the opposite side to the storage chamber with respect to the first heat-insulating material and has thermal conductivity lower than that of the first heat-insulating material, and a heat-storage material which is provided at least partially in a region where the second heat-insulating material is not provided as viewed from a thickness direction of the first heat-insulating material on the same side as the storage chamber with respect to the first heat-insulating material and is formed of one or more kinds of raw material where phase transition is caused between a liquid phase and a solid phase at a temperature between the temperature outside the storage chamber and the temperature inside the storage chamber obtained by the function of the temperature-controlled unit.

In the storage container, the heat-storage material may be disposed from a first region which does not overlap the second heat-insulating material as viewed from the thickness direction of the first heat-insulating material to a second region which overlaps the second heat-insulating material across an edge of the second heat-insulating material.

In the storage container, in a portion where a heat input amount from the opposite side to the storage chamber is relatively large in the edges of the second heat-insulating material, a distance to an edge of the heat-storage material in the second region as viewed from the thickness direction of the first heat-insulating material may be long compared to a distance to an edge of the heat-storage material in the second region in a portion where the heat input amount is relatively small in the edges of the second heat-insulating material.

In the storage container, a thickness of the heat-storage material in a portion overlapping the portion where the heat input amount from the opposite side to the storage chamber is relatively large in the edges of the second heat-insulating material may be thicker than that of the heat-storage material in a portion overlapping the portion where the heat input amount is relatively small in the edges of the second heat-insulating material.

In the storage container, the heat-storage material may be formed by using plural kinds of raw material, and a raw material of the heat-storage material in a portion overlapping the portion where the heat input amount from the opposite side to the storage chamber is relatively large in the edges of the second heat-insulating material may have temperature conductivity in a phase transition temperature lower than that of a raw material of the heat-storage material in a portion overlapping the portion where the heat input amount is relatively small in the edges of the second heat-insulating material.

In the storage container, the second region may include a region overlapping a portion where thermal conductivity in the thickness direction of the second heat-insulating material is larger than or equal to that in the thickness direction of the first heat-insulating material.

In the storage container, the second region may include a region overlapping a portion where the thermal conductivity in the thickness direction of the second heat-insulating material is larger than or equal to 0.02 W/(m·K).

In the storage container, the distance from the edge of the second heat-insulating material to the edge of the heat-storage material in the second region as viewed from the thickness direction of the first heat-insulating material may be 20 mm or more.

In the storage container, the heat-storage material may be only disposed in a first region which does not overlap the second heat-insulating material as viewed from the thickness direction of the first heat-insulating material.

In the storage container, a plurality of second heat-insulating materials may be provided discretely, and the heat-storage material may be continuously provided in the first region between a pair of second heat-insulating materials adjacent to each other in the plurality of second heat-insulating materials.

In the storage container, the first region may include the whole of a region which does not overlap the second heat-insulating material as viewed from the thickness direction of the first heat-insulating material, in a region of the first heat-insulating material adjacent to the storage chamber.

In the storage container, at least one of the heat-storage material and the second heat-insulating material may be provided in an attachable and detachable manner.

The storage container may further include a third heat-insulating material provided on the same side as the storage chamber with respect to the first heat-insulating material.

In the storage container, the third heat-insulating material may be provided in an attachable and detachable manner.

In the storage container, the heat-storage material may be attachable and detachable integrally with the third heat-insulating material.

In the storage container, the third heat-insulating material may be formed of the same material as the second heat-insulating material.

In the storage container, the thermal conductivity in the thickness direction of a peripheral portion including an outer periphery of the second heat-insulating material as viewed from the thickness direction of the second heat-insulating material may be higher than that in the thickness direction of the center portion not including the outer periphery of the second heat-insulating material.

In the storage container, the second heat-insulating material may include an exterior body in which a pressure in the inside thereof is reduced to be lower than the atmosphere and a base material accommodated inside the exterior body.

A storage container of a second aspect of the invention includes: a container body having an opening; a door member closing the opening in an openable and closable manner; and a temperature-controlled unit having a function of making a temperature inside a storage chamber enclosed by the container body and the door member be different from a temperature outside the storage chamber. The container body includes a first heat-insulating material, a third heat-insulating material which is provided partially on the same side as the storage chamber with respect to the first heat-insulating material and has thermal conductivity lower than that of the first heat-insulating material, and a heat-storage material which is provided at least partially in a region where the third heat-insulating material is not provided as viewed from a thickness direction of the first heat-insulating material on the same side as the storage chamber with respect to the first heat-insulating material and is formed of one or more kinds of raw material where phase transition is caused between a liquid phase and a solid phase at a temperature between the temperature outside the storage chamber and the temperature inside the storage chamber obtained by the function of the temperature-controlled unit.

In the storage container, at least one of the heat-storage material and the third heat-insulating material may be provided in an attachable and detachable manner.

Advantageous Effects of Invention

According to the present invention, it is possible to effectively improve performance of heat insulation between the outside of the storage container and the inside of the storage chamber.

DESCRIPTION OF EMBODIMENTS

Hereinafter, an embodiment of the invention will be described with reference to the drawings.

First Embodiment

Figure 1:
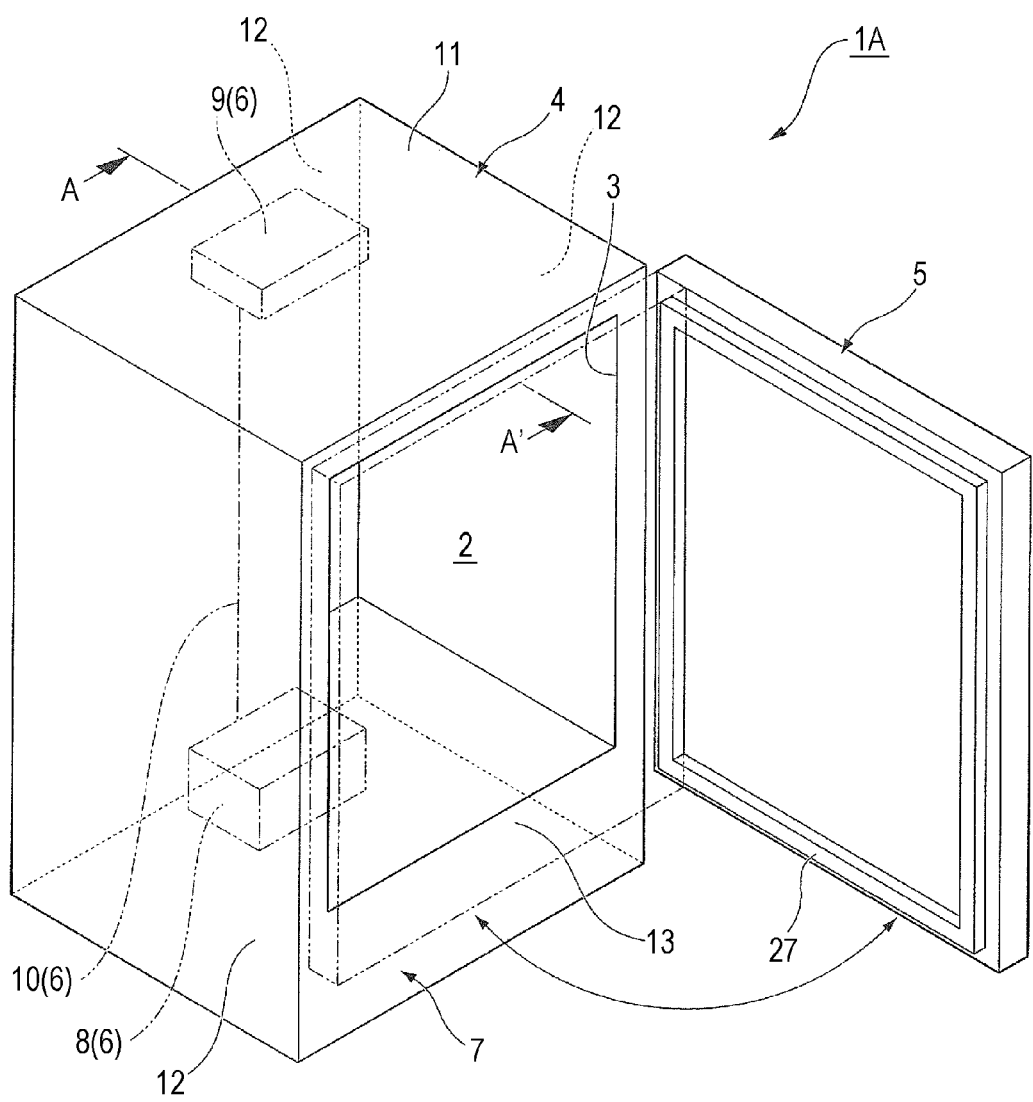
FIG. 1 is a perspective view illustrating a schematic configuration of a storage container of a first embodiment.
Figure 2:
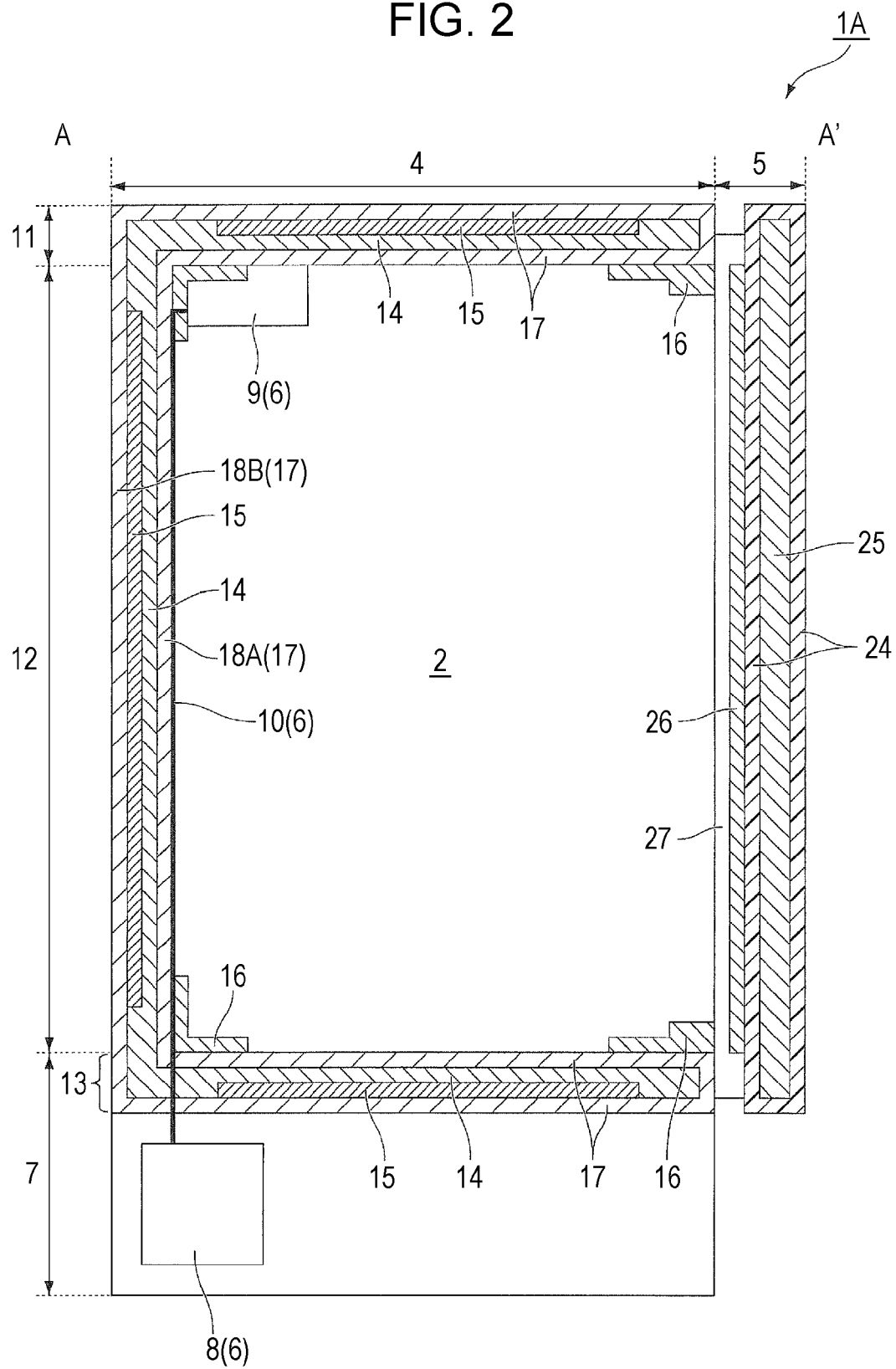
FIG. 2 is a cross-sectional view illustrating a schematic configuration of the storage container of the first embodiment.

FIG. 1 is a perspective view illustrating a schematic configuration of a storage container of a first embodiment. FIG. 2 is a cross-sectional view illustrating a schematic configuration of the storage container of the first embodiment and corresponds to a cross-sectional view taken along line A-A' in FIG. 1.

A storage container 1A illustrated in FIGS. 1 and 2 can store a stored material in a storage chamber 2 in the storage container 1A at a temperature within a predetermined temperature range different from a temperature (a living temperature) outside the storage container 1A. The storage container 1A of the embodiment is a refrigerator; however, it may be a freezer or a heating cabinet. In addition, the storage container 1A may include two or more storage chambers of a storage chamber functioning as the refrigerator, a storage chamber functioning as the freezer and a storage chamber functioning as the heating cabinet.

As illustrated in FIG. 1, the storage container 1A includes a container body 4 having an opening 3, a door member 5 closing the opening 3 in an openable and closable manner, and a temperature-controlled unit 6. The storage chamber 2 is surrounded by the door member 5 and the container body 4 in a state where the opening 3 is closed. The temperature-controlled unit 6 has a function of making a temperature inside the storage chamber 2 different from a temperature outside the storage chamber 2 by receiving power supply. It is possible to manage the temperature inside the storage chamber 2 to be lower than an ambient temperature, to be higher than the ambient temperature, or to be a setting temperature which is optionally set within a predetermined range.

In addition, the setting temperature is appropriately set depending on types of the material to be stored or storage states such as chilled (storage immediately before freezing), partial (slightly freezing storage or half freezing storage), or freezing storage. For example, the setting temperature of the refrigerator may be set in a range of 0° C. or higher and 10° C. or lower. In particular, for example, a setting temperature of a chilled chamber in the refrigerator may be set in a range of 0° C. or higher and 2° C. or lower. For example, a setting temperature of the freezer may be set in a range of −40° C. or higher and −10° C. or lower. For example, a setting temperature of the heating cabinet may be set in a range of higher than 10° C. and 100° C. or lower.

For example, a source of power supply to the temperature-controlled unit 6 may be one or a combination of two or more of a commercial power source outside the storage container 1A, a battery, and a power generator such as a solar cell. At least one of the battery and the power generator may be a part of the storage container 1A or may be a part of an apparatus different from the storage container 1A.

The temperature-controlled unit 6 of the embodiment is a gas compression type. The temperature-controlled unit 6 has a compressor 8 provided on a bottom portion 7 of the container body 4, a cooler 9 provided and exposed in the storage chamber 2, a pipe 10 connecting the compressor 8 and the cooler 9, a temperature sensor, and a controller (not illustrated).

The compressor 8 changes refrigerant of a gas phase to that of a liquid phase by compressing the refrigerant and can deliver the refrigerant of the liquid phase to the pipe 10. The refrigerant of the liquid phase delivered to the pipe 10 is carried to the cooler 9 and is vaporized by taking heat from a periphery of the cooler 9. In other words, the cooler 9 cools the periphery of the cooler 9 by vaporization heat of the refrigerant. The refrigerant returned to the gas phase in the inside of the cooler 9 returns to the compressor 8 through the pipe 10 and circulates in a circulation system composed of the compressor 8, the cooler 9, and the pipe 10.

The temperature sensor of the temperature-controlled unit 6 can measure a temperature at a predetermined position inside the storage chamber 2. A controller of the temperature-controlled unit 6 can control a delivery amount or the like of the refrigerant which is delivered by the compressor 8 based on the measuring results obtained by the temperature sensor so that the temperature inside the storage chamber 2 approaches the setting temperature.

In addition, the temperature-controlled unit 6 may have a generally known configuration such as a condenser for radiating the heat from the compressed refrigerant or a dryer for removing moisture in the refrigerant. Furthermore, the temperature-controlled unit 6 may be a unit of a gas absorption type or an electronic type using Peltier element or the like. In addition, for example, the temperature-controlled unit 6 may be a unit of an indirect cooling type (cold air forced circulation system) other than a direct cooling type (cold air natural convection system) where the cooler 9 is exposed to the storage chamber 2 as described above. The indirect cooling type is a type of cooling the inside of the storage chamber 2 by circulating in the storage chamber 2 the cold air generated in the cooler 9 with a fan or the like.

The container body 4 of the embodiment has a box-shaped square form. The container body 4 has the bottom portion 7, a top plate portion 11 which is disposed above the bottom portion 7 and faces the bottom portion 7, three side plate portions 12 substantially vertically extending to the top plate portion 11 with respect to the bottom portion 7. The bottom portion 7 has a bottom plate portion 13 including an upper surface facing the top plate portion 11. The bottom plate portion 13 constitutes a bottom surface of the storage chamber 2. A lower surface of the bottom portion 7 facing the opposite side to the top plate portion 11 constitutes a bottom surface of the storage container 1A. The compressor 8 of the temperature-controlled unit 6 is disposed below the bottom plate portion 13 provided between the storage chamber 2 and the compressor 8.

The top plate portion 11 and the bottom plate portion 13 have rectangular shapes with substantially the same dimensions as viewed from above in a plan view. Three side plate portions 12 are provided in portions corresponding to three sides among four sides of the top plate portion 11 and the bottom plate portion 13 viewed from above in a plan view, and the opening 3 is made in a portion corresponding to the remaining one side.

In the embodiment, when the top plate portion 11, the side plate portion 12, and the bottom plate portion 13 are not distinguished from each other, each plate portion may be simply referred to as a plate portion of the container body 4. Furthermore, for each plate portion of the container body 4, a side facing the storage chamber 2 may be referred to as an inner side and a side facing the outside of the storage container 1A may be referred to as an outer side.

As illustrated in FIG. 2, the side plate portion 12, the top plate portion 11 and the bottom plate portion 13 of the container body 4 each have a first heat-insulating material 14, a second heat-insulating material 15 which is provided partially on a part opposite to the storage chamber 2 with respect to the first heat-insulating material 14, a heat-storage material 16 which is provided on the same side as the storage chamber 2 with respect to the first heat-insulating material 14, and a case 17. In each plate portion of the container body 4, a thickness direction of the first heat-insulating material 14 is substantially parallel to a thickness direction of the plate portion where the first heat-insulating material 14 belongs.

The case 17 is formed integrally in the top plate portion 11, the three side plate portions 12, and the bottom plate portion 13. The case 17 has an inner wall 18A and an outer wall 18B facing each other, and accommodates the first heat-insulating material 14 and the second heat-insulating material 15 between the inner wall 18A and the outer wall 18B. For example, the case 17 is formed of a resin material such as ABS resin and can increase, for example, rigidity of the storage container 1A. The outer wall 18B of the case 17 can protect each portion disposed inside the outer wall 18B from damage or the like. The inner wall 18A of the case 17 can prevent a stored material from contacting with each portion disposed outside the inner wall 18A with respect to the storage chamber 2.

The first heat-insulating material 14 can suppress heat transfer which is carried out through the first heat-insulating material 14 between the inside of the storage chamber 2 and the outside of the storage container 1A. For example, the first heat-insulating material 14 is composed of a heat-insulating material which is generally known such as a porous material, specifically, a fiber-based heat-insulating material such as glass wool, a foam resin-based heat-insulating material such as polyurethane foam, or a natural fiber-based heat-insulating material such as cellulose fiber. For example, the thermal conductivity of the porous heat-insulating material is approximately 0.02 W/(m·K) in a hard urethane foam, is approximately 0.03 W/(m·K) in extruded polystyrene foam, is approximately 0.04 W/(m·K) in beaded polystyrene foam, and is approximately 0.045 W/(m·K) in glass wool.

Figure 3:
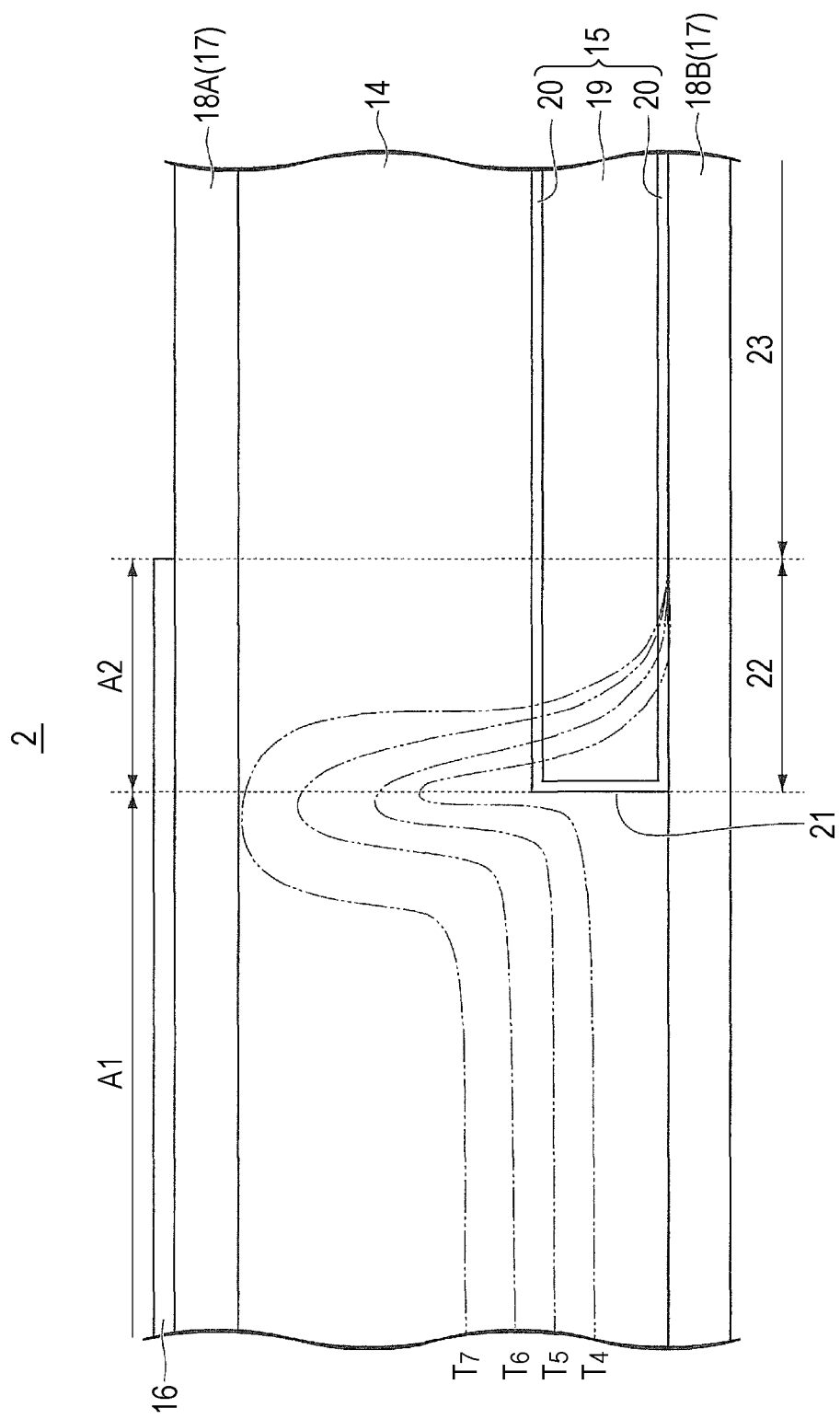
FIG. 3 is a conceptual view illustrating temperature distributions of a vacuum heat-insulating material of the first embodiment and a vicinity of an edge thereof.

The second heat-insulating material 15 of the embodiment illustrated in FIG. 3 is a vacuum heat-insulating material and includes a plate-shaped base material 19 and an exterior body 20 hermetically packaging the base material 19. For example, the base material 19 is a porous material like the first heat-insulating material. For example, the exterior body 20 is composed of a laminated film or the like, and an outer surface thereof is coated with a metal film reflecting light. The exterior body 20 has a structure in which films covering each of the front and back surfaces of the base material 19 are welded or bonded to each other on the outside of the outer periphery of the base material 19 as viewed from the thickness direction of the second heat-insulating material 15. For example, the thermal conductivity of a vacuum heat material is approximately 0.008 W/(m·K) when the base material 19 is silica, is approximately 0.006 W/(m·K) when the base material 19 is communication urethane, is approximately 0.004 W/(m·K) when the base material 19 is glass wool, and is approximately 0.002 W/(m·K) when the base material 19 is orientation glass wool.

Furthermore, the second heat-insulating material 15 desirably has a value (hereinafter, simply referred to as an average value of the thermal conductivity) which is obtained by averaging values of the thermal conductivity in the thickness direction inside a plane orthogonal to the thickness direction thereof and which is smaller than an averaged value of the thermal conductivity of the first heat-insulating material 14. The second heat-insulating material 15 may include such a porous heat-insulating material described above. For example, the first heat-insulating material 14 may be composed of polystyrene foam and the second heat-insulating material 15 may be composed of hard urethane foam. In addition, at least a part of the first heat-insulating material 14 may be composed of the vacuum heat-insulating material.

The pressure of the inside of the exterior body 20 is reduced to a pressure (for example, approximately 1 Pa or more and 100 Pa or less) lower than the atmosphere pressure. The base material 19 supports the exterior body 20 so that the exterior body 20 does not collapse due to a pressure difference between the outside and the inside of the exterior body 20. In addition, a getter material for adsorbing moisture or gas is enclosed inside the exterior body 20 in addition to the base material 19.

However, the base material of the vacuum heat-insulating material is generally formed by, for example, heating and compressing glass wool or the like and it is not easy to perform bending or the like on the base material. In the embodiment, the plate-shaped second heat-insulating material 15 is used and the second heat-insulating material 15 is disposed individually on each plate portion of the top plate portion 11, the three side plate portions 12 and the bottom plate portion 13. The second heat-insulating material 15 is disposed at a position which is separated from a corner between each plate portion and other plate portions. For example, in the top plate portion 11, the second heat-insulating material 15 is disposed to be separated from a corner between the top plate portion 11 and the side plate portions 12. As described above, the container body 4 includes a plurality of second heat-insulating materials 15 which are disposed discretely.

Figure 4:
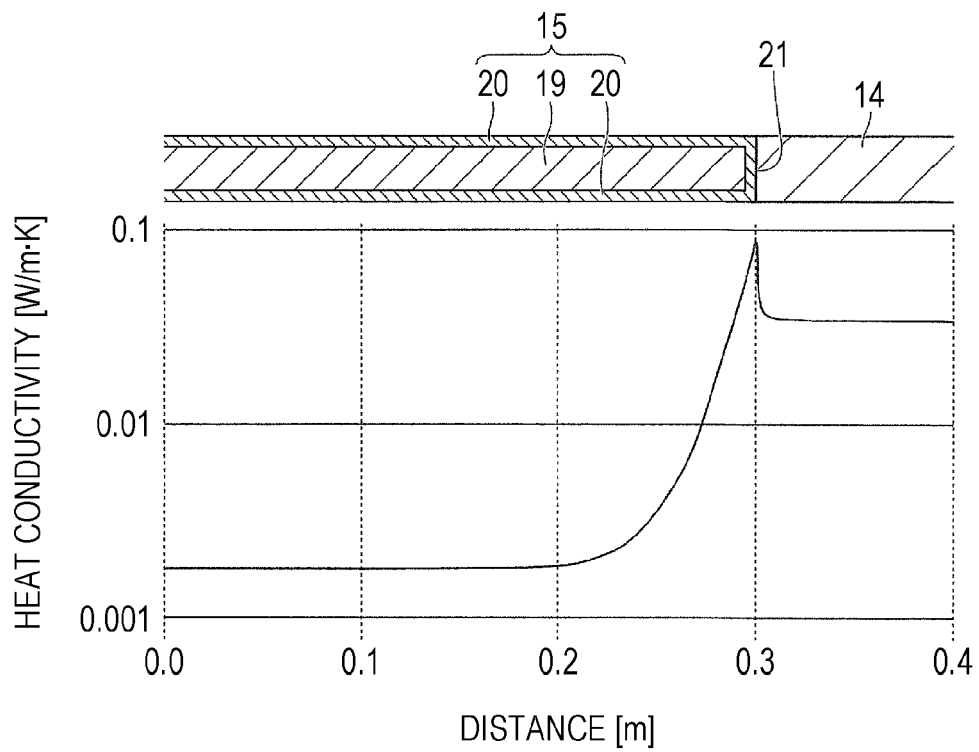
FIG. 4 is an explanatory view illustrating distribution of thermal conductivity of a peripheral portion and a surrounding portion of the vacuum heat-insulating material.

FIG. 4 is an explanatory view illustrating distribution of thermal conductivity of the peripheral portion and a surrounding portion of the vacuum heat-insulating material. In addition, in FIG. 4, the first heat-insulating material 14 is composed of glass wool. As described above, the fact that the second heat-insulating materials 15 are disposed discretely means that an edge 21 of the second heat-insulating material 15 is present in a direction orthogonal to the thickness direction of the second heat-insulating material 15. As described above, in the edge 21, the exterior body 20 communicates with both the front and back surfaces of the second heat-insulating material 15 without passing through the inside (the base material 19) where the pressure is reduced. Accordingly, as illustrated in FIG. 4, local thermal conductivity in the direction orthogonal to the thickness direction of the second heat-insulating material 15 is high at a position closer to the edge 21.

The exterior body 20 may be coated with a metal film or the like which reflects infrared light from the viewpoint of suppressing heat input due to radiation. In this case, the thermal conductivity in the vicinity of the edge 21 is close to the thermal conductivity of the metal film practically and is significantly increased as compared to the thermal conductivity of the center portion away from the edge 21 in the second heat-insulating material 15. In the second heat-insulating material 15, a range where the local thermal conductivity is the average value (for example, 0.02 W/(m·K)) or more of the thermal conductivity of the first heat-insulating material 14 is a range where a distance from the edge 21 is less than 20 mm.

Next, raw materials and characteristics of the heat-storage material 16 will be described and, subsequently, disposition of the heat-storage material 16 will be described. The heat-storage material 16 is formed by using a raw material (hereinafter, referred to as the heat-storage raw material) in which phase transition is caused between the liquid phase and the solid phase at a temperature between the setting temperature (a temperature within a predetermined range) of the storage chamber 2 described above and the living temperature (an ambient temperature) outside the storage container 1A.

In the embodiment, the living temperature described above is a temperature which is assumed as a temperature in the environment where the storage container 1A is used. For example, in the storage container 1A, when the setting temperature of the storage chamber 2 is 4° C. and the assumed living temperature is 25° C., the heat-storage material 16 is formed by using a raw material where the temperature (hereinafter, referred to as a phase transition temperature) at which the phase transition is caused between the liquid phase and the solid phase is higher than 4° C. and lower than 25° C.

As described in the embodiment, when the storage container 1A is the refrigerator, for example, the heat-storage raw material for forming the heat-storage material 16 is selected from raw materials where a peak temperature of the phase transition temperature is 0° C. or higher and 10° C. or lower. When the storage chamber 2 is the chilled chamber, for example, the raw heat-storage material for forming the heat-storage material 16 is selected from raw materials where the peak temperature of the phase transition temperature is 0° C. or higher and 2° C. or lower. When the storage chamber 2 is the freezer, for example, the heat-storage raw material for forming the heat-storage material 16 is selected from raw materials where the peak temperature of the phase transition temperature is −20° C. or higher and −10° C. or lower.

In addition, the phase transition temperature of the heat-storage raw material can be measured by using a differential scanning calorimeter (DSC). For example, if the differential scanning calorimeter is used and a temperature-falling rate is measured as 1° C./min, the peak temperature of the phase transition temperature can be measured as the peak temperature when the phase transition is caused from liquid phase to the solid phase.

The heat-storage material 16 of the embodiment has a structure in which paraffin serving as the heat-storage raw material is packaged with a protective film. The protective film can, for example, suppress a change in shape due to the phase change between the solid phase and the liquid phase of the heat-storage raw material or can suppress a change in quality or deterioration of the heat-storage raw material.

In addition, for example, the heat-storage raw material for forming the heat-storage material 16 may be formed of a raw material which is generally known such as water, 1-decanol, $SO_2 \cdot 6H_2O$, $C_4H_3O \cdot 17H_2O$, $(CH_2)3N \cdot 10\frac{1}{4}H_2O$ in addition to paraffin. Furthermore, the heat-storage material may contain two or more types of various materials described above. Furthermore, the heat-storage raw material may contain additives or the like for regulating various physical properties such as viscosity or a freezing point. For example, the phase transition temperature can be regulated to a desired value by dissolving solute which is appropriately selected in the heat-storage raw material and by freezing point depression.

Furthermore, the heat-storage material 16 may be formed such that a shape thereof can be maintained by gelating the heat-storage material when the phase change occurs between the solid phase and the liquid phase. In this case, the protective film described above can be omitted appropriately. Furthermore, the heat-storage material 16 may be formed in a slurry shape by microencapsulation or the like.

In this case, when the phase change occurs between the solid phase and the liquid phase, it is possible to reduce or eliminate an amount of change in the volume and it is possible to maintain substantially constantly a heat resistance in a contact surface between the heat-storage material 16 and other members.

Figure 5:
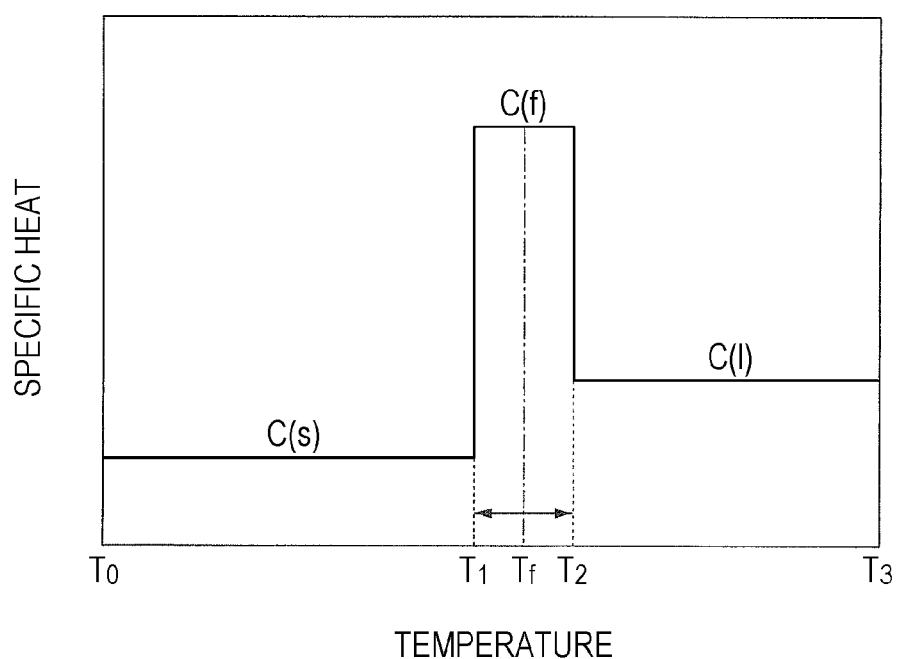
FIG. 5 is a graph conceptually illustrating a change in specific heat due to phase transition of a heat-storage material.

FIG. 5 is a graph conceptually illustrating a change in a specific heat due to the phase transition of the heat-storage raw material. In the graph in FIG. 5, the horizontal axis represents the temperature and the vertical axis represents the specific heat. The heat-storage raw material is in a solid state (the solid phase) in a temperature range of $T_0$° C. or higher and lower than $T_1$° C. and the specific heat thereof is C(s). The heat-storage raw material is in a liquid state (the liquid phase) in a temperature range of $T_2$ or higher and lower than $T_3$ and the specific heat thereof is C(l). In the heat-storage material, the phase transition is caused between the solid phase and the liquid phase in a temperature range (a phase transition temperature Tf) of $T_1$° C. or higher and lower than $T_2$° C.

When the temperature of the heat-storage raw material is within the range of the phase transition temperature Tf, an amount of heat which is absorbed by the heat-storage raw material is consumed in the phase change from the solid phase to the liquid phase and does not contribute practically to increase the temperature of the heat-storage raw material. When treating latent heat as the specific heat C(f) from such a viewpoint, the specific heat C(f) is significantly larger than both the specific heat C(s) and the specific heat C(l). In addition, when the phase transition temperature Tf has a temperature width, it is possible to obtain a conversion value of the latent heat into the specific heat C(f) by dividing a total amount of the latent heat by the temperature width of the phase transition temperature Tf.

The thermal conductivity is generally used as an index indicating ease of heat transfer (or difficulty of heat transfer) in a medium (heat-storage raw material) which is in a temperature range that does not cause the phase change; however, since the heat input into the heat-storage raw material is consumed in the phase change in the phase transition temperature Tf as described above, it is difficult to evaluate ease of heat transfer only by the thermal conductivity.

The inventors of the invention have found that difficulty of the heat transfer can be evaluated in the heat-storage raw material at the phase transition temperature Tf when introducing an index of the temperature conductivity, as a result of intensive study. Temperature conductivity $\alpha$ [m²/s] is represented by the following expression (1) by using thermal conductivity k [W/(m·K)], density $\rho$ [kg/m³], and a specific heat or a conversion value of the latent heat into the specific heat C [J/(kg·K)], and it shows that the heat transfer is difficult as the value is small.

$$\alpha = k/(\rho \cdot C) \quad (1)$$

For example, paraffin has the thermal conductivity of approximately 0.34 [W/(m·K)], the latent heat of approximately 114500 [J/(kg·K)], the density of approximately 810 [kg/m³], and the temperature conductivity of approximately $3.7 \times 10^{-9}$. In addition, the vacuum heat-insulating material has the thermal conductivity of approximately 0.001 [W/(m·K)], the specific heat of approximately 1005 [J/(kg·K)], the density of approximately 150 [kg/m³], and the temperature conductivity of approximately $6.6 \times 10^{-9}$. When comparing only the thermal conductivity between paraffin and the vacuum heat-insulating material, the heat transfer is significantly difficult in the vacuum heat-insulating material.

However, when comparing temperature conductivity between paraffin at the phase transition temperature Tf and vacuum heat-insulating material, it is found that the heat transfer is difficult in paraffin at the phase transition temperature Tf practically to a similar extent as in the vacuum heat-insulating material.

As illustrated in FIG. 3, the heat-storage material 16 of the embodiment is provided at least partially in a region where the second heat-insulating material 15 is not provided as viewed from the thickness direction of the first heat-insulating material 14. The heat-storage material 16 of the embodiment is disposed from a first region A1 which does not overlap the second heat-insulating material 15 as viewed from the thickness direction of the first heat-insulating material 14 to a second region A2 which overlaps a peripheral portion 22 of the second heat-insulating material 15 across the edge 21 of the vacuum heat-insulating material. Furthermore, the heat-storage material 16 is disposed so as not to overlap a center portion 23 of the second heat-insulating material 15 as viewed from the thickness direction of the first heat-insulating material 14. In the embodiment, in the second heat-insulating material 15 as viewed from the thickness direction, a frame-shaped portion including a whole outer periphery (edge) of the second heat-insulating material 15 is referred to as the peripheral portion 22 and a portion inside the peripheral portion 22 is referred to as the center portion 23.

In the embodiment, the peripheral portion 22 of the second heat-insulating material 15 is a region where a local thermal conductivity is greater than or equal to the thermal conductivity (for example, 0.02 W/(m·K)) of the first heat-insulating material 14. In the description below, a distance from the edge 21 of the second heat-insulating material 15 to the edge of the heat-storage material 16 as viewed from the thickness direction of the first heat-insulating material 14, that is, a width of the second region A2 with respect to the outer periphery of the second heat-insulating material 15 in the circumferential direction may be referred to as an overlap amount. In the embodiment, the overlap amount is set to be 20 mm or more.

Symbols $T_4$ to $T_7$ in FIG. 3 represent isothermal lines in the temperature distribution in the first heat-insulating material 14, respectively. The isothermal line $T_4$ among the isothermal lines $T_4$ to $T_7$ corresponds to the highest temperature, the isothermal line $T_5$ corresponds to a high temperature next to the temperature of the isothermal line 14, the isothermal line $T_6$ corresponds to a high temperature next to the temperature of the isothermal line $T_5$, and the isothermal line $T_7$ corresponds to the lowest temperature. As described above, the thermal conductivity of the second heat-insulating material 15 is highest at the edge 21. In the first heat-insulating material 14, since the heat is transferred from the edge 21 to the first heat-insulating material 14 in the thickness direction and a direction orthogonal to the thickness direction, the temperature in a portion overlapping the peripheral portion 22 as viewed from the thickness direction is higher than that in the portion overlapping the center portion 23.

As described above, in each plate portion of the container body 4, since the temperature conductivity of the center portion 23 of the second heat-insulating material 15 is significantly low in the region overlapping the center portion 23 of the second heat-insulating material 15 as viewed from the thickness direction of the first heat-insulating material 14, the heat transfer from the outside of the container body 4 to the inside of the storage chamber 2 is suppressed.

In the embodiment, the heat-storage material 16 is disposed on the storage chamber 2 side with respect to the first heat-insulating material 14 and stores heat. Since the heat-storage material 16 at the phase transition temperature Tf has low temperature conductivity similar to that of the second heat-insulating material 15, the heat-storage material 16 functions as a heat-insulating material similar to the second heat-insulating material 15. Since the heat-storage material 16 is disposed in the first region A1 which does not overlap the second heat-insulating material 15 as viewed from the thickness direction of the first heat-insulating material 14, the heat transfer to the storage chamber 2 through the first heat-insulating material 14 and the heat-storage material 16 is suppressed in the first region A1.

In addition, the heat-storage material 16 is also disposed in the second region A2 which overlaps the peripheral portion 22 as viewed from the thickness direction of the first heat-insulating material 14. Therefore, the heat transferred through the portion overlapping the peripheral portion 22 in the first heat-insulating material 14 is consumed in the phase change of the heat-storage material 16 disposed in the second region A2 and is suppressed to be transferred to the storage chamber 2. As described above, in the container body 4 of the embodiment, the heat transfer from the outside of the container body 4 to the inside of the storage chamber 2 is suppressed in any of the region overlapping the center portion 23 of the second heat-insulating material 15, the second region A2 overlapping the peripheral portion 22, and the first region A1 which does not overlap the second heat-insulating material 15, as viewed from the thickness direction of the first heat-insulating material 14.

In the embodiment, the container body 4 has a structure in which the second heat-insulating material 15 is disposed individually on each plate portion of the container body 4 and a plurality of the second heat-insulating materials 15 are disposed discretely. In the embodiment, the heat-storage material 16 is continuously provided in the first region A1 between a pair of second heat-insulating materials 15 adjacent to each other across the corner of the container body 4. For example, the heat-storage material 16 extends from the second region A2 overlapping the peripheral portion 22 of the second heat-insulating material 15 in the top plate portion 11 to the outer periphery of the top plate portion 11, and extends from the outer periphery of the side plate portion 12 to the second region A2 overlapping the peripheral portion 22 of the second heat-insulating material 15 in the side plate portion 12 through the corner portion of the top plate portion 11 and the side plate portion 12.

In the embodiment, the first region A1 is the whole of the region which does not overlap the second heat-insulating material 15 as viewed from the thickness direction of the first heat-insulating material 14. In other words, the storage chamber 2 is surrounded by the second heat-insulating material 15 and the heat-storage material 16 disposed in the first region A1 substantially without a gap. In other words, when drawing an imaginary line perpendicular to the plate portion in any position of each plate portion of the container body 4, the imaginary line intersects at least one of the second heat-insulating material 15 and the heat-storage material 16.

The door member 5 illustrated in FIGS. 1 and 2 is rotatably attached to the container body 4 through a connection member such as a hinge (not illustrated). When the door member 5 is closed, the opening 3 of the container body 4 is blocked and the storage chamber 2 is sealed. When the door member 5 is open, the opening 3 is open and the material to be stored can be placed in or the stored material can be removed from the storage chamber 2.

The door member 5 of the embodiment has a hollow plate-shaped case 24, a plate-shaped heat-insulating material 25 accommodated in the case 24, a heat-storage material 26 and a packing 27 which are provided on a surface facing the container body 4 in a closed state of the door member 5. The case 24 and the heat-insulating material 25 are, for example, formed of the same material as the container body 4.

The packing 27 has a shape surrounding the outer periphery of the opening 3 in a frame shape as viewed from the thickness direction of the door member 5 in the closed state. The heat-storage material 26 is disposed at least in a whole region, surrounded by the packing 27, of the surface facing the container body 4 in the closed state of the door member 5. The packing 27 includes a magnet or the like and is in close contact with the periphery of the opening 3 of the container body 4 in the closed state of the door member 5.

However, since the heat-insulating material is discontinuous between the container body 4 and the door member 5, a portion of the container body 4 located near to the opening 3 easily introduces the heat from the outside of the storage container 1A compared to other portions thereof. In the embodiment, distribution of a heat-storage amount of the heat-storage material 26 of the door member 5 is set such that the heat-storage amount per unit area within a plane orthogonal to the thickness direction of the heat-insulating material 25 at the portion located near to the opening 3 is larger than that of the other portions thereof.

In the embodiment, the heat-storage material 26 of the door member 5 is prepared such that the thickness of the portion thereof located near to the opening 3 is set to be thicker than that of the other portions thereof and the distribution of the heat-storage amount described above is realized. In addition, the thickness of the heat-storage material 26 may be changed stepwise with respect to the normal direction of the door member 5 in the closed state or may be continuously varied.

In addition, a specific method for providing the distribution of the heat-storage amount per unit area may be a method for partially differentiating the heat-storage raw material in addition to the method for providing the distribution in the thickness of the heat-storage material 26 as described above. For example, the heat-storage raw material in the portion of the heat-storage material 26, which is located near to the opening 3, may be formed of a heat-storage raw material where the temperature conductivity in the phase transition temperature described above is smaller than the other portions thereof.

Furthermore, the method for providing the distribution of the heat-storage amount per unit area may be obtained by combining the method for providing the distribution in the thickness and the method for partially differentiating the heat-storage raw material described above. For example, the heat-storage material 26 is composed of a first layer formed of a first heat-storage raw material in a portion other than the portion located near to the opening 3, and the heat-storage material 26 may be composed of the first layer and a second layer formed of a second heat-storage raw material laminated on the first layer in the portion located near to the opening 3, the temperature conductivity of the second heat-storage raw material in the phase transition temperature being smaller than that of the first heat-storage raw material.

Furthermore, in the embodiment, the distribution of the heat-storage amount in the heat-storage material 16 in the first region A1 is set such that the heat-storage amount per unit area within the plane orthogonal to the thickness direction of the first heat-insulating material 14 at the portion located near to the opening 3 is larger than in the other portions thereof. In the embodiment, the heat-storage material 16 in the first region A1 is provided such that the thickness of the portion located near to the opening 3 is thicker than that of the other portions thereof and the distribution of the heat-storage amount described above is realized. In addition, the method for providing the distribution of the heat-storage amount per unit area may be any of the methods described with respect to the heat-storage material 26 of the door member.

In addition, the door member may be configured to open and close the storage chamber 2 by sliding on a rail. In addition, the door member may be provided in an attachable and detachable manner with respect to the container body 4, and may be configured to open and close the storage chamber 2 by being attached and detached.

In addition, for example, the door member 5 may have a vacuum heat-insulating material provided in the case 24 on the opposite side to the heat-storage material 26 with respect to the heat-insulating material 25 similarly to the container body 4. In this case, the heat-storage material 16 may be provided in a region overlapping the peripheral portion of the vacuum heat-insulating material as viewed from the thickness direction of the heat-insulating material 25 similarly to each plate portion of the container body 4. With such a structure, the heat transfer to the inside of the storage chamber 2 through the edge of the vacuum heat-insulating material can also be suppressed in the door member.

Figure 6:
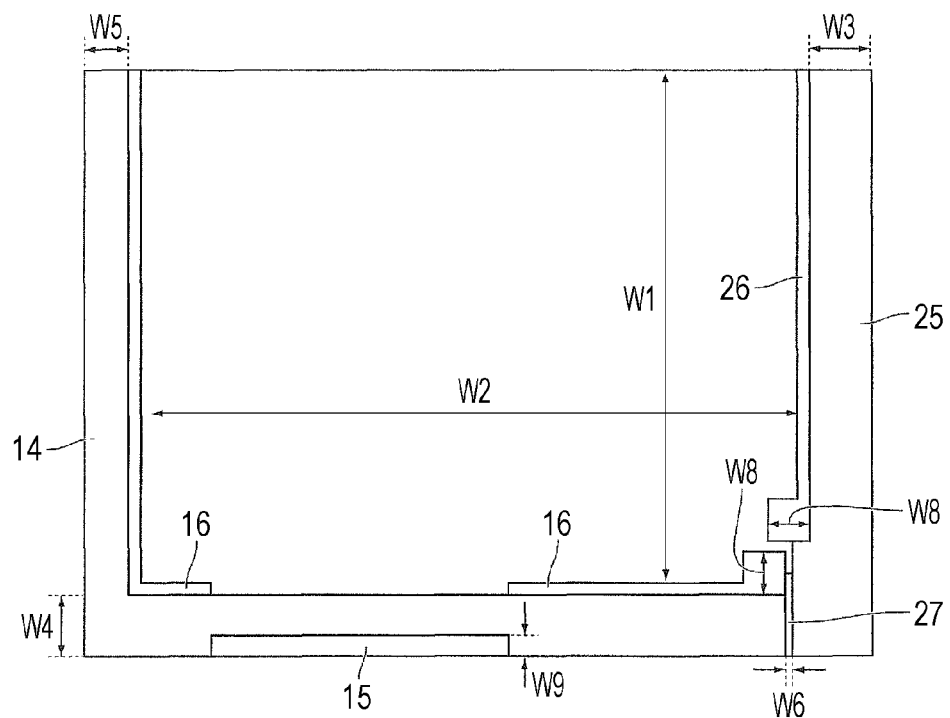
FIG. 6 is a view illustrating a calculation model for determining the temperature distribution in the storage container of a comparison example.
Figure 7:
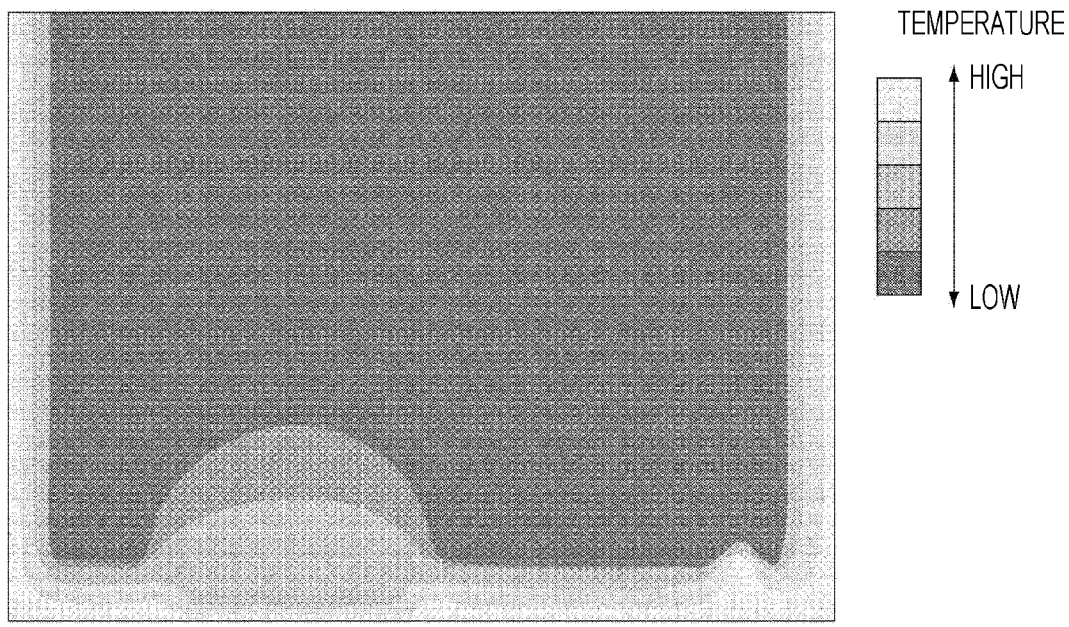
FIG. 7 is a view illustrating a simulation result of the temperature distribution in the storage container of a comparison example.
Figure 8:
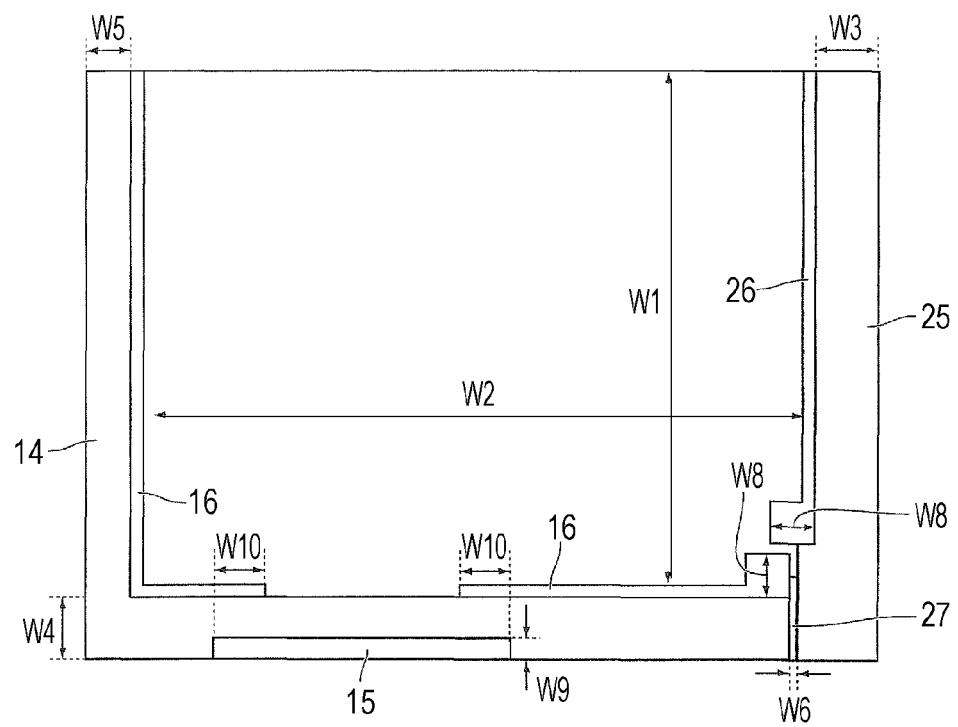
FIG. 8 is a view illustrating a calculation model for determining the temperature distribution in the storage container of an example.
Figure 9:
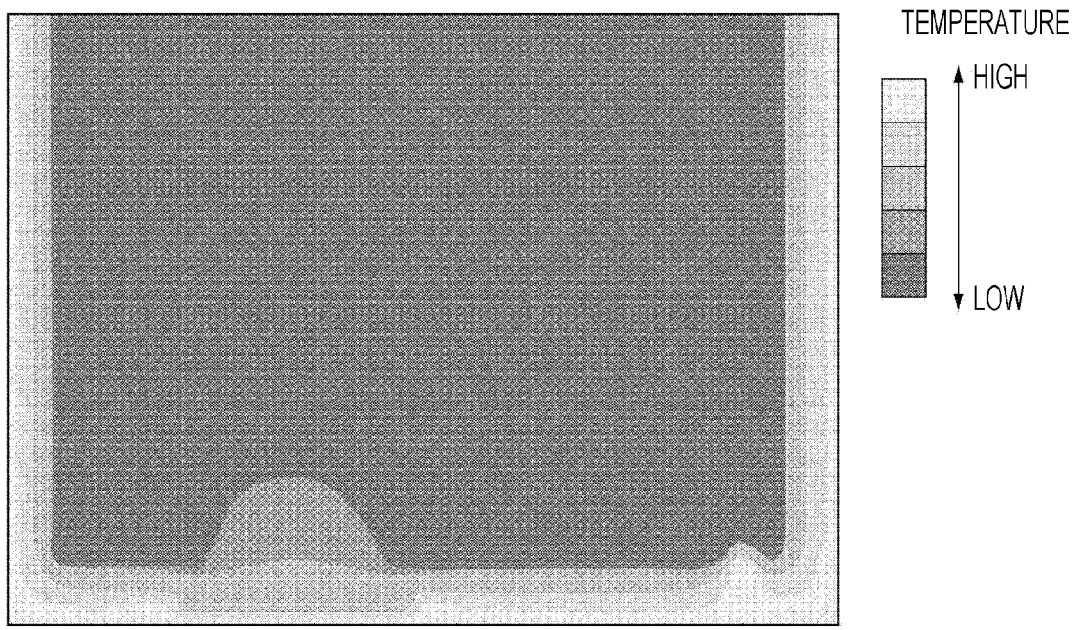
FIG. 9 is a view illustrating a simulation result of the temperature distribution in the storage container of the example.

Next, with respect to a storage container of a comparison example and a storage container of an embodiment, a simulation result obtained by examining a temporal change of the temperature distribution in each storage container will be described. FIG. 6 is a view illustrating a calculation model for determining the temperature distribution in the inside of the storage container of the comparison example. FIG. 7 is a view illustrating the simulation result of the temperature distribution in the storage container of the comparison example. FIG. 8 is a view illustrating a calculation model for determining the temperature distribution in the storage container of an example. FIG. 9 is a view illustrating the simulation result of the temperature distribution in the storage container of the example.

The simulation is obtained by performing unsteady thermal conductivity analysis on the temporal change in the temperature in the storage chamber by using a method of numerical simulation in a state where cooling inside the storage chamber is stopped. The temperature outside the storage container was fixed at 30° C. and an initial condition of the temperature inside the storage chamber was set at 3° C. The inside of the storage chamber was filled with air, the raw material of the heat-insulating material was foamed urethane foam, the material of the heat-storage material was paraffin, and the material of the packing was iron. A calculation region was set in a region which is substantially half from an end of the door member 5 in the width direction of the door member 5 within a plane as viewed from the thickness direction of the top plate portion 11 considering symmetry of the storage container.

The calculation model of the comparison example illustrated in FIG. 6 is the same as the calculation model of the embodiment illustrated in FIG. 8 excluding that the heat-storage material is not disposed in the region overlapping the peripheral portion of the vacuum heat-insulating material as viewed from the thickness direction of the plate of the heat-insulating material. In FIG. 6, for the sake of convenience of the description, the same symbols are given to the elements similar to those in the storage container of the first embodiment.

Symbols W1 and W2 in FIG. 6 are inner dimensions of the storage chamber 2, symbols W3 to W5 are thicknesses of the heat-insulating material, a symbol W6 is a thickness of the packing 27 provided on a bonding portion between the container body 4 and the door member 5, symbols W7 and W8 are thicknesses of the heat-storage material 16, and a symbol W9 is a thickness of the vacuum heat-insulating material. A symbol W10 in FIG. 8 is a width of the second region, in other words, is a distance from the edge of the vacuum heat-insulating material to the edge of the heat-storage material as viewed from the thickness direction of the heat-insulating material.

In this example, values are: W1 is 400 mm, W2 is 500 mm, W3 is 45 mm, W4 is 45 mm, W5 is 35 mm, W6 is 1 mm, W7 is 2 mm, W8 is 20 mm, W9 is 15 mm, and W10 is 40 mm.

In both of the temperature distribution of the comparison example illustrated in FIG. 7 and the temperature distribution of the example illustrated in FIG. 9, the temperature in the periphery of the second heat-insulating material 15 is increased; however, the range where the temperature is increased in the example is a range significantly narrower than that of the comparison example. From this, it is found that the heat transfer from the outside of the storage container to the inside of the storage chamber 2 can be suppressed by disposing the heat-storage material 16 in the second region A2 overlapping the peripheral portion 22 of the second heat-insulating material 15 as viewed from the thickness direction of the first heat-insulating material 14.

Figure 10:
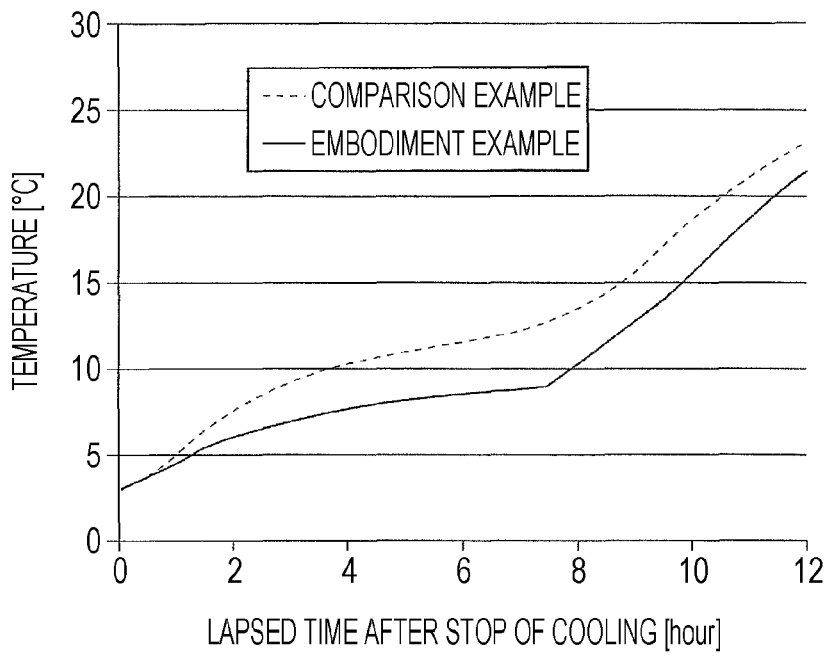
FIG. 10 is a graph illustrating a comparison of the example and the comparison example for temporal changes in the temperature in the storage container.

FIG. 10 is a graph illustrating a comparison of the example and the comparison example for temporal changes in the temperature in the storage container. Specifically, FIG. 10 is a graph in which data of a point which is set in a position located near to the center portion 23 of the second heat-insulating material 15 in the inside of the storage chamber 2 regarding the above numerical simulation results are extracted and the temperatures of the point in relation to a lapsed time after the stop of cooling in the inside of the storage chamber 2 are plotted. As can be seen from the graph in FIG. 10, the increase in the temperature (approaching the temperature of the outside) in the example is suppressed compared to the comparison example after the stop of the cooling in the inside of the storage chamber 2. When comparing a time period during which the temperature of the inside of the storage chamber 2 is held at 10° C. or lower, the time period is approximately 8 hours in the example while approximately 4 hours in the comparison example. Accordingly, it can be seen that the storage container of the example can store the stored material at a temperature within an allowable range for a long period compared to the storage container of the comparison example.

In the storage container 1A having the configuration described above, since the second heat-insulating material 15 of which the thermal conductivity is smaller than that of the first heat-insulating material 14 is disposed on the opposite side to the storage chamber 2 with respect to the first heat-insulating material 14, heat insulating performance of the region where the second heat-insulating material is provided as viewed from the thickness direction of the first heat-insulating material 14 is increased. In addition, in the storage container 1A, since the heat-storage material 16 is provided at least partially in the region where the second heat-insulating material 15 is not provided as viewed from the thickness direction of the first heat-insulating material 14 on the same side as the storage chamber 2 with respect to the first heat-insulating material 14, the cold insulation performance in case of power outage is increased in the region where the second heat-insulating material is not provided as viewed from the thickness direction of the first heat-insulating material 14.

As described above, in the storage container 1A, it is possible to effectively improve performance of the heat insulation between the outside of the storage container and the inside of the storage chamber. Therefore, for example, even when cooling in the inside of the storage chamber 2 is weakened by the temperature-controlled unit 6, it is possible to extend the time period in which the temperature is held within the allowable range in the inside of the storage chamber 2. Accordingly, for example, it is possible to reduce the power which is necessary to operate the compressor 8 or the like and it is possible to reduce energy which is necessary to maintain the material to be stored in a desired temperature. Furthermore, even when the cooling function of the temperature-controlled unit 6 is reduced or stopped in case of power outage or the like, it is possible to extend the time period in which the temperature in the inside of the storage chamber 2 is held within the allowable range and it is possible to maintain the material to be stored in the temperature within the allowable range for a long period.

In addition, since substantially the whole periphery of the storage chamber is covered with the second heat-insulating material 15 or the heat-storage material 16, it is possible to significantly suppress the heat transfer between the outside of the storage container 1A and the inside of the storage chamber 2. In addition, in the storage container 1A, since the heat-storage material 16 is disposed so as not to overlap a part of the second heat-insulating material 15, it is possible to reduce the heat-storage material 16.

In addition, in the storage container 1A, since the second heat-insulating material 15 is composed of the vacuum heat-insulating material, the heat insulating performance of the storage container 1A is increased compared to a case of the second heat-insulating material 15 being composed of a porous heat-insulating material. In addition, in the storage container 1A, since the heat-storage material 16 is disposed from the first region A1 which does not overlap the second heat-insulating material as viewed from the thickness direction of the first heat-insulating material 14 to the second region A2 which overlaps the second heat-insulating material 15 across the edge of the second heat-insulating material 15, it is possible to effectively suppress the heat input through a heat path at the edge of the second heat-insulating material 15.

In addition, in the first region A1 which does not overlap the second heat-insulating material 15 as viewed from the thickness direction of the first heat-insulating material 14, specifically in a portion where the temperature is easily transferred between the outside of the storage container 1A and the inside of the storage chamber 2, for example, in the portion located near to the opening 3, the thickness of the heat-storage material 16 is partially thickened, and thus the heat which is transferred between the outside of the storage container 1A and the inside of the storage chamber 2 is consumed in the phase change of the heat-storage material 16 and it is possible to significantly suppress the heat transfer between the outside of the storage container 1A and the inside of the storage chamber 2.

Second Embodiment

Next, a second embodiment will be described. In the second embodiment, the same symbols as the first embodiment are given to the same configuration elements as the first embodiment and the description thereof will be simplified or omitted.

Figure 11:
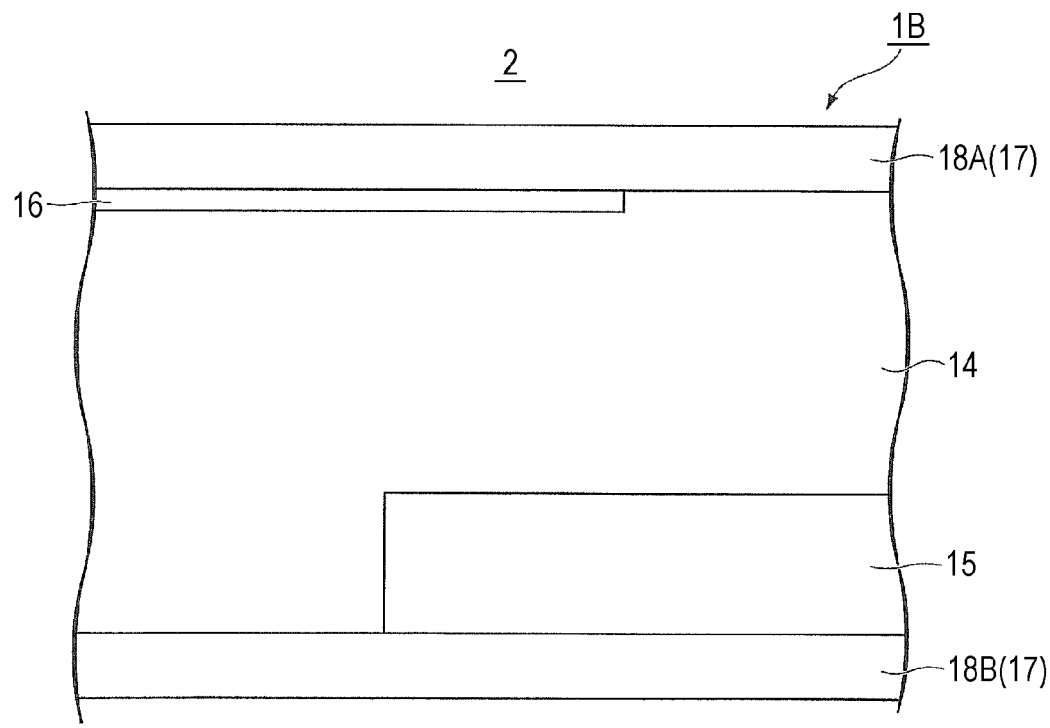
FIG. 11 is a cross-sectional view illustrating a schematic configuration of a storage container of a second embodiment.

FIG. 11 is a cross-sectional view illustrating a schematic configuration of a storage container of the second embodiment. In a storage container 1B illustrated in FIG. 11, the heat-storage material 16 is disposed inside the case 17 in each plate portion of the container body 4. In the storage container 1B of the second embodiment, it is possible to significantly suppress the heat transfer between the outside of the storage container 1A and the inside of the storage chamber 2 for the same reason as the first embodiment. In addition, the heat-storage material 16 is prevented from contacting with an object inside the storage chamber 2 and damage or the like to the heat-storage material 16 is prevented.

Third Embodiment

Next, a third embodiment will be described. In the third embodiment, the same symbols as the first embodiment are given to the same configuration elements as the first embodiment and the description thereof will be simplified or omitted.

Figure 12:
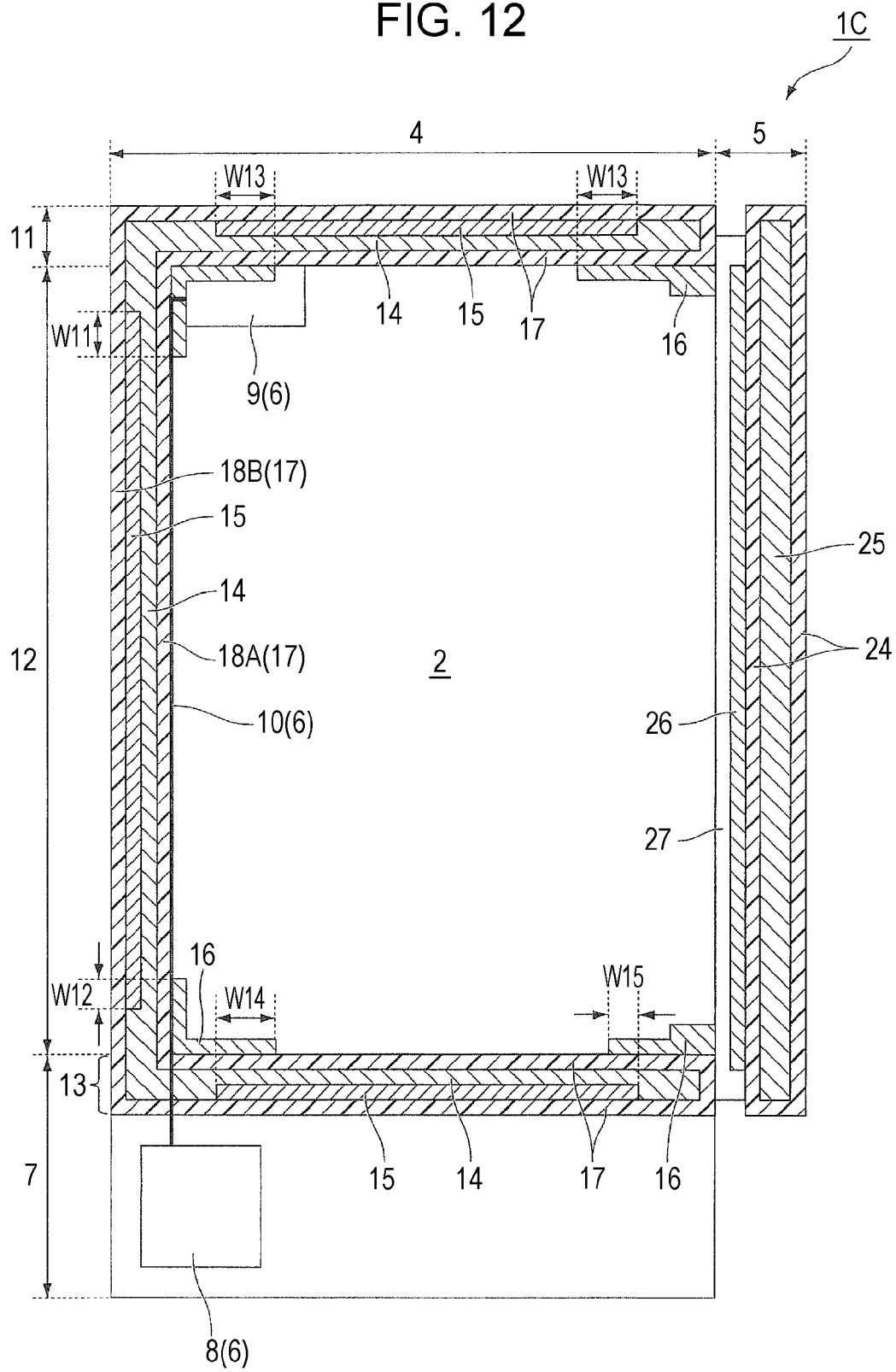
FIG. 12 is a cross-sectional view illustrating a schematic configuration of a storage container of a third embodiment.

FIG. 12 is a cross-sectional view illustrating a schematic configuration of a storage container of the third embodiment. In a storage container 1C illustrated in FIG. 12, a distance (an overlap amount) from the edge 21 of the second heat-insulating material 15 to the edge of the heat-storage material 16 as viewed from the thickness direction of the first heat-insulating material 14 is partially varied (has distribution) in each position of the outer periphery of the second heat-insulating material 15.

Particularly, in a portion where the heat input amount from the opposite side to the storage chamber 2 at the edge 21 of the second heat-insulating material 15 is relatively large, an overlap amount is set to be large compared to a portion where the heat input amount at the edge 21 of the second heat-insulating material 15 is relatively small. In the embodiment, the portion where the heat input amount described above is relatively small is a vicinity of the edge of the second heat-insulating material 15 which is located at a lower portion of the side plate portion 12, a vicinity of the edge of the second heat-insulating material 15 of the bottom plate portion 13, which is separated from the compressor 8, or the like. In addition, the portion where the heat input amount described above is relatively large is a vicinity of the edge of the second heat-insulating material 15 of the top plate portion 11 and a vicinity of the edge of the second heat-insulating material 15 which is disposed at a position directly above the compressor 8.

In the embodiment, an overlap amount W11 of the heat-storage material 16 in the vicinity of the edge of the second heat-insulating material 15 which is located at an upper portion of the side plate portion 12 is larger than an overlap amount W12 in the vicinity of the edge of the second heat-insulating material 15 which is disposed at the lower portion of the side plate portion 12. In addition, an overlap amount W13 of the heat-storage material 16 in the vicinity of the edge of the second heat-insulating material 15 of the top plate portion 11 is larger than the overlap amount W11 of the heat-storage material 16 in the vicinity of the edge of the second heat-insulating material 15 which is disposed at the upper portion of the side plate portion 12. In addition, an overlap amount W14 of the heat-storage material 16 in the vicinity of the edge of the second heat-insulating material 15 disposed at a position directly above the compressor 8 is larger than the overlap amount W12 of the heat-storage material 16 in the vicinity of the edge of the second heat-insulating material 15 which is disposed at the lower portion of the side plate portion 12. The overlap amount W14 of the heat-storage material 16 in the vicinity of the edge of the second heat-insulating material 15 disposed at a position directly above the compressor 8 is larger than an overlap amount W15 of the heat-storage material 16 in the vicinity of the edge of the second heat-insulating material 15 of the bottom plate portion 13, which is separated from the compressor 8.

In the storage container 1C of the embodiment, it is possible to significantly suppress the heat transfer between the outside of the storage container 1A and the inside of the storage chamber 2 for the same reason as the first embodiment. In addition, since the overlap amount is set to be relatively large in the portion where the heat input amount is relatively large at the edge 21 of the second heat-insulating material 15, it is possible to increase a total amount of the latent heat of the heat-storage material 16 in the portion where the heat input amount is relatively large. Accordingly, since the amount of heat which is necessary to change the phase of the heat-storage material 16 is increased in the portion where the heat input amount is relatively large and the heat transfer between the outside of the storage container 1A and the inside of the storage chamber 2 can be significantly suppressed, it is possible to effectively improve the heat insulating performance of the storage container.

Fourth Embodiment

Next, a fourth embodiment will be described. In the fourth embodiment, the same symbols as the first embodiment are given to the same configuration elements as the first embodiment and the description thereof will be simplified or omitted.

Figure 13:
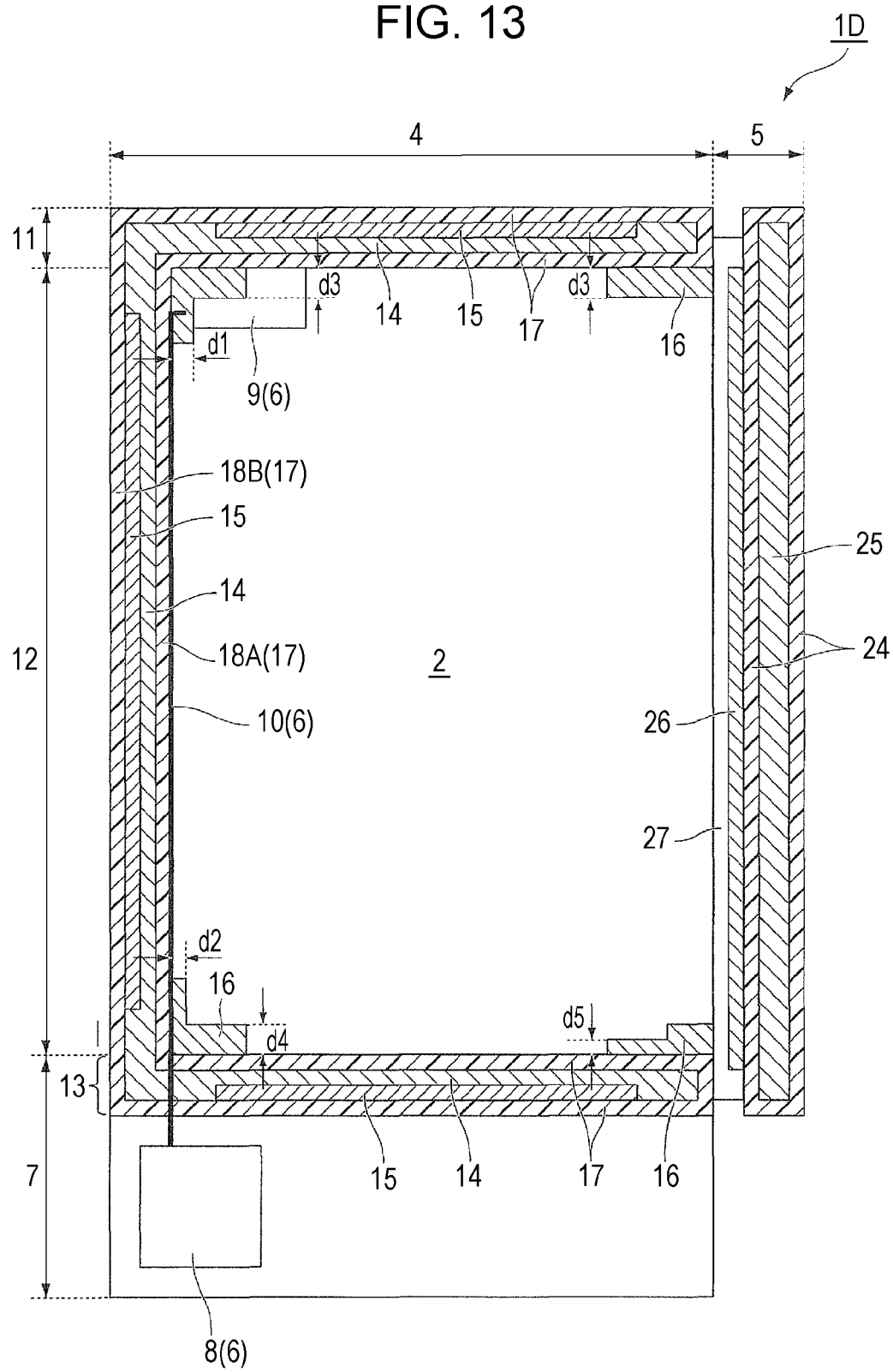
FIG. 13 is a cross-sectional view illustrating a schematic configuration of a storage container of a fourth embodiment.

FIG. 13 is a cross-sectional view illustrating a schematic configuration of a storage container of the fourth embodiment. In a storage container 1D illustrated in FIG. 13, the thickness of the heat-storage material in a portion overlapping the vacuum heat-insulating material is partially varied (has distribution) in each position of the outer periphery of the second heat-insulating material 15.

Particularly, the thickness of the heat-storage material in a portion overlapping the portion where the heat input amount from the opposite side to the storage chamber 2 at the edge of the second heat-insulating material 15 is relatively large is set to be thicker than that in a portion overlapping the portion where the heat input amount is relatively small. The portion where the heat input amount described above is relatively large and the portion where the heat input amount is relatively small are the same as those in the third embodiment.

In the embodiment, a thickness d1 of the heat-storage material 16 in the vicinity of the edge of the second heat-insulating material 15 which is disposed at an upper portion of the side plate portion 12 is larger than a thickness d2 in the vicinity of the edge of the second heat-insulating material 15 which is disposed at the lower portion of the side plate portion 12. In addition, a thickness d3 of the heat-storage material 16 in the vicinity of the edge of the second heat-insulating material 15 of the top plate portion 11 is larger than the thickness d1 of the heat-storage material 16 in the vicinity of the edge of the second heat-insulating material 15 which is disposed at the upper portion of the side plate portion 12. In addition, an overlap amount W14 of the heat-storage material 16 in the vicinity of the edge of the second heat-insulating material 15 disposed at a position directly above the compressor 8 is larger than the thickness d2 of the heat-storage material 16 in the vicinity of the edge of the second heat-insulating material 15 which is disposed at the lower portion of the side plate portion 12. A thickness d4 of the heat-storage material 16 in the vicinity of the edge of the second heat-insulating material 15 disposed at a position directly above the compressor 8 is larger than a thickness d5 of the heat-storage material 16 in the vicinity of the edge of the second heat-insulating material 15 of the bottom plate portion 13, which is separated from the compressor 8.

In the storage container 1D of the embodiment, it is possible to significantly suppress the heat transfer between the outside of the storage container 1A and the inside of the storage chamber 2 for the same reason as the first embodiment. In addition, since the thickness of the heat-storage material 16 is set to be relatively large in the portion where the heat input amount is relatively large at the edge 21 of the second heat-insulating material 15, it is possible to increase a total amount of the latent heat of the heat-storage material 16 in the portion where the heat input amount is relatively large. Accordingly, since the amount of heat which is necessary to change the phase of the heat-storage material 16 is increased in the portion where the heat input amount is relatively large and the heat transfer between the outside of the storage container 1A and the inside of the storage chamber 2 can be significantly suppressed, it is possible to effectively improve the heat insulating performance of the storage container.

Furthermore, in the method for providing the distribution in the overlap amount in the third embodiment described above and in the method for providing distribution in the thickness of the heat-storage material in the fourth embodiment, thermal insulation (cold insulation) function in the portion where the heat input amount is relatively large is higher than that in the portion where the heat input amount is relatively small; however, as a method for partially strengthening or weakening the thermal insulation function, it is possible to use the method for partially differentiating the raw heat-storage material in the heat-storage material as described above. In addition, it is possible to combine two or more methods among the method for providing the distribution in the overlapping amount, the method for providing the distribution in the thickness of the heat-storage material, and the method for partially differentiating the heat-storage raw material in the heat-storage material.

Next, a storage container of a modification example will be described. FIGS. 14(A) to 14(C) and FIGS. 15(A) to 15(E) are cross-sectional views illustrating the storage containers of the modification examples, respectively. In each modification example, the same symbols as the embodiments described above are given to the same configuration elements as the embodiments described above and the description thereof will be simplified or omitted.

Figure 14:
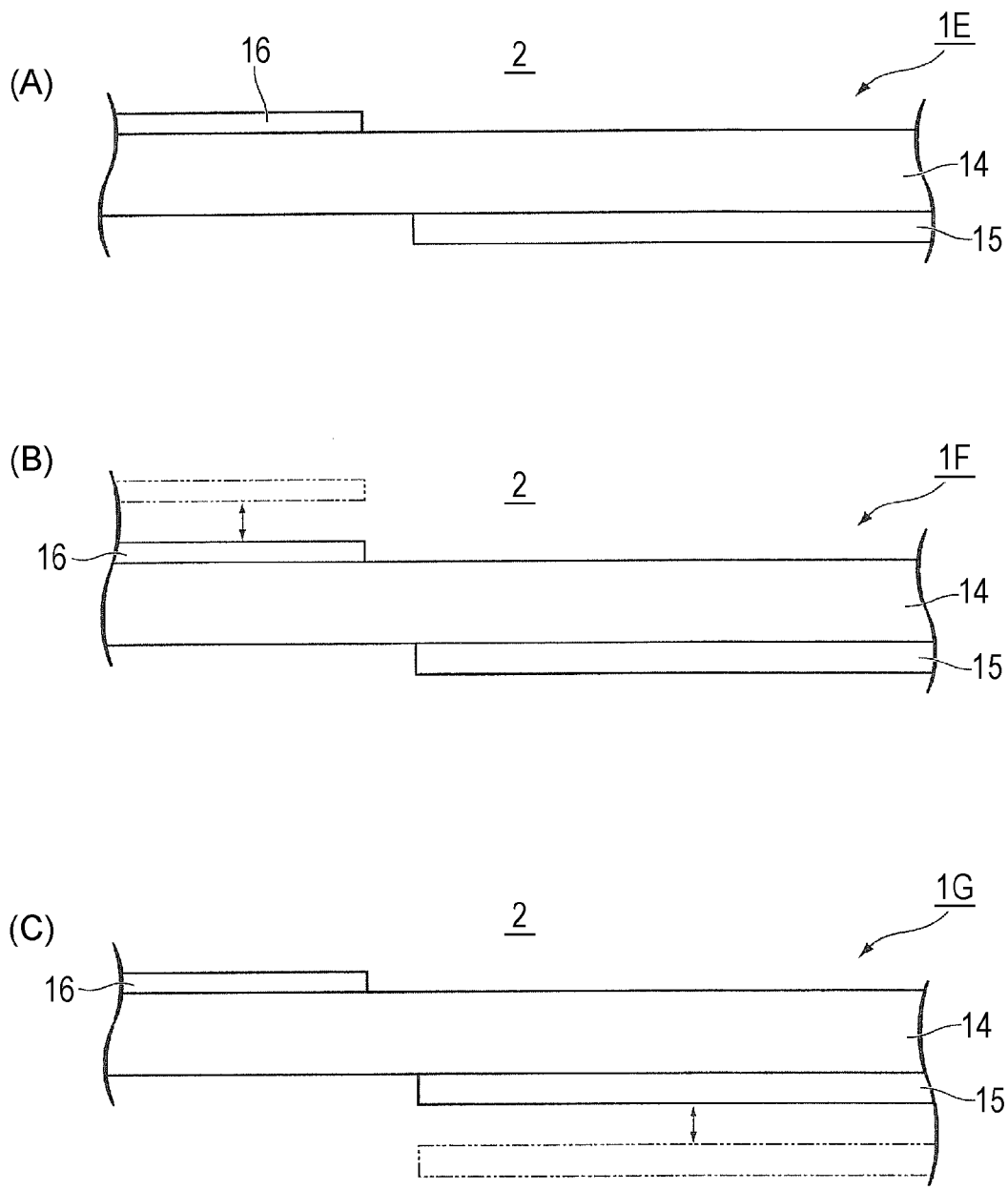
FIGS. 14(A) to 14(C) are cross-sectional views illustrating schematic configurations of storage containers of modification examples.

In a storage container 1E of a modification example 1 illustrated in FIG. 14(A), in the second heat-insulating material 15, at least a part of the outer periphery as viewed from the thickness direction of the first heat-insulating material 14 does not overlap the heat-storage material 16. In the example, the heat-storage material 16 is disposed only in the region (the first region) which does not overlap the second heat-insulating material 15 as viewed from the thickness direction of the first heat-insulating material 14.

In a storage container 1F of a modification example 2 illustrated in FIG. 14(B), the heat-storage material 16 is provided in an attachable and detachable manner. The heat-storage material 16 of the example is held in a holding body such as a hard case. The holding body is fixed to the first heat-insulating material 14 or the case 17 described in the above embodiments with a magnet, set screw, concavo-convex fitting, a latch member such as a hook in the attachable and detachable manner.

In a storage container 1G of a modification example 3 illustrated in FIG. 14(C), the second heat-insulating material 15 is provided in an attachable and detachable manner. The second heat-insulating material 15 of the example is held in a holding body such as a hard case. The holding body is fixed to the first heat-insulating material 14 or the case 17 described in the above embodiments with the magnet, the set screw, concavo-convex fitting, the latch member such as the hook or the like in the attachable and detachable manner. In addition, in the storage container 1G of the modification example 3, the heat-storage material 16 may be provided in the attachable and detachable manner as the modification example 2.

Figure 15:
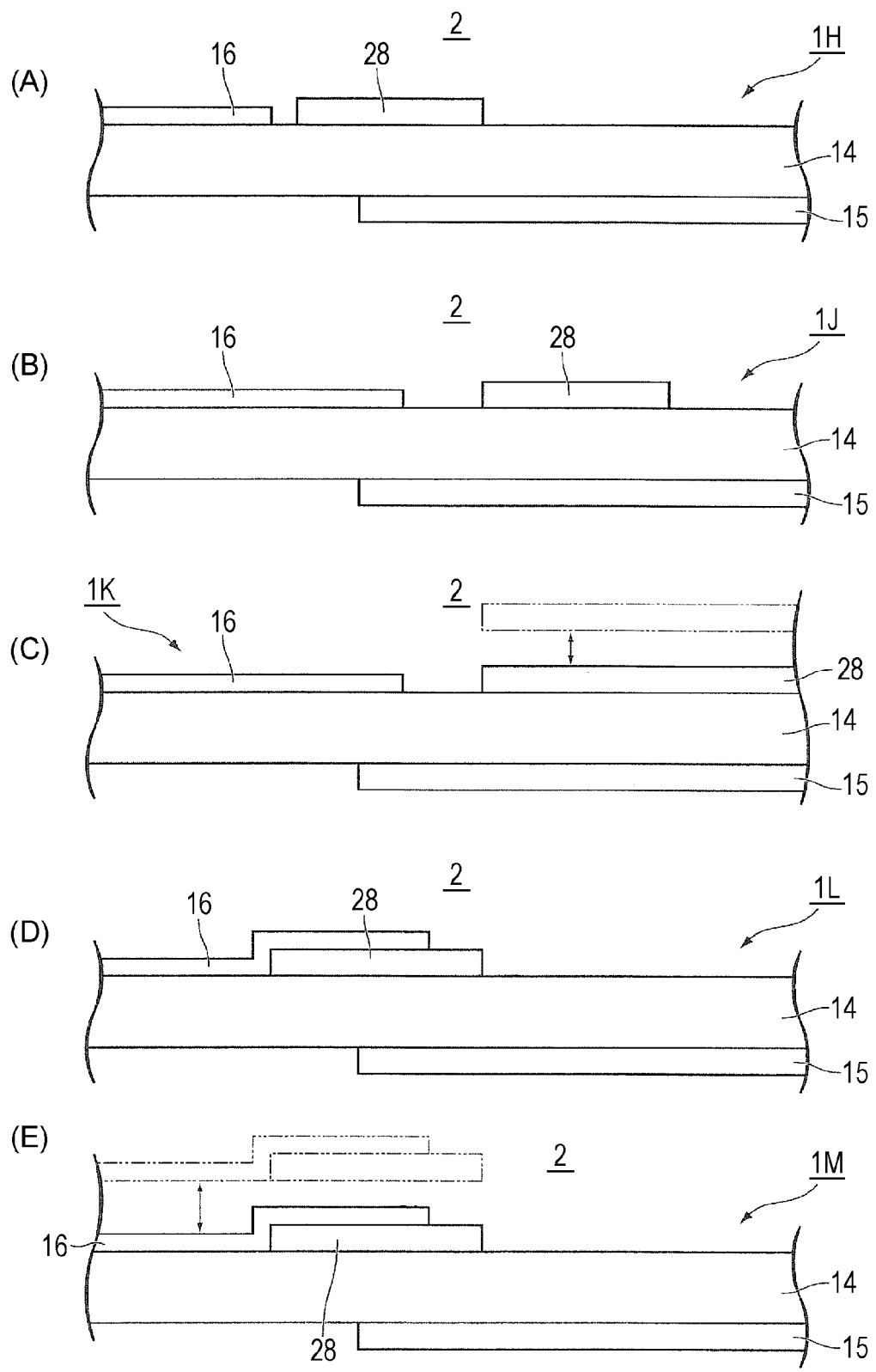
FIGS. 15(A) to 15(E) are cross-sectional views illustrating schematic configurations of storage containers of modification examples.

A storage container 1H of a modification example 4 illustrated in FIG. 15(A) includes a third heat-insulating material 28 provided on the same side as a storage chamber A with respect to the first heat-insulating material 14 and having thermal conductivity which is smaller than that of the first heat-insulating material 14. The third heat-insulating material 28 of the example is disposed such that at least a part thereof overlaps the outer periphery of the second heat-insulating material 15 as viewed from the thickness direction of the first heat-insulating material 14. In the example, the second heat-insulating material 15 as viewed from the thickness direction of the first heat-insulating material 14 is disposed so as to overlap the heat-storage material 16 or the third heat-insulating material 28. The heat-storage material 16 of the example is disposed so as not to overlap the third heat-insulating material 28 as viewed from the thickness direction of the first heat-insulating material 14.

The third heat-insulating material 28 of the example is composed of the same material as the second heat-insulating material 15, for example, composed of the vacuum heat-insulating material. In addition, the third heat-insulating material 28 may be formed of a material different from the second heat-insulating material 15 and the thermal conductivity thereof may be higher or lower than that of the second heat-insulating material 15. In addition, the second heat-insulating material 15 is provided and the thermal conductivity of the third heat-insulating material 28 may be higher or lower than that of the first heat-insulating material 14.

In a storage container 1J of a modification example 5 illustrated in FIG. 15(B), the third heat-insulating material 28 is disposed so as not to overlap the outer periphery of the second heat-insulating material 15 as viewed from the thickness direction of the first heat-insulating material 14.

In a storage container 1K of a modification example 6 illustrated in FIG. 15(C), the third heat-insulating material 28 is provided in an attachable and detachable manner. The third heat-insulating material 28 of the example is held in a holding body such as a hard case. The holding body is fixed to the first heat-insulating material 14 or the case 17 described in the above embodiments with the magnet, the set screw, concavo-convex fitting, the latch member such as the hook or the like in the attachable and detachable manner.

In addition, in the modification example 4 or the modification example 5, the third heat-insulating material 28 may be provided in the attachable and detachable manner as the third heat-insulating material 28 of the modification example 6. Furthermore, in the modification example 4 to the modification example 6, at least one of the second heat-insulating material 15 and the heat-storage material 16 may be provided in the attachable and detachable manner as the modification examples described above.

In a storage container 1L of a modification example 7 illustrated in FIG. 15(D), the third heat-insulating material 28 is disposed so as to overlap the outer periphery of the second heat-insulating material 15 as viewed from the thickness direction of the first heat-insulating material 14. Furthermore, the heat-storage material 16 of the example is disposed so as to overlap the third heat-insulating material 28 as viewed from the thickness direction of the first heat-insulating material 14 and to overlap the outer periphery of the second heat-insulating material 15.

In a storage container 1M of a modification example 8 illustrated in FIG. 15(E), the heat-storage material 16 may be attached and detached integrally with the third heat-insulating material 28. In the example, the heat-storage material 16 is held in the same holding body as the third heat-insulating material 28. The holding body is fixed to the first heat-insulating material 14 or the case 17 described in the above embodiments with the magnet, set screw, concavo-convex fitting, the latch member such as the hook or the like in the attachable and detachable manner.

In addition, in the modification example 7 and the modification example 8, the second heat-insulating material 15 may be provided in the attachable and detachable manner as the modification examples described above. Furthermore, in the modification example 7, the heat-storage material 16 may be provided to be attachable and detachable separately from the third heat-insulating material 28, and may be fixed to the first heat-insulating material 14, the case 17, or the like. Furthermore, in the modification example 7, the heat-storage material 16 may be fixed to the first heat-insulating material 14, the case 17, or the like, and the third heat-insulating material 28 may be provided to be attachable and detachable separately from the heat-storage material 16. Furthermore, the storage container may include at least one of the second heat-insulating material 15 and the third heat-insulating material 28. For example, when the third heat-insulating material 28 is provided as described in the modification example 4 to the modification example 8, the storage container may be provided without the second heat-insulating material 15.

In the storage container of each modification example described above, since the heat-storage material 16 is provided at least partially in the region where the second heat-insulating material 15 or the third heat-insulating material is not provided as viewed from the thickness direction of the first heat-insulating material 14, the heat insulating performance of the storage container is effectively increased. Furthermore, if at least one of the second heat-insulating material 15, the third heat-insulating material 28, and the heat-storage material 16 is attachable and detachable, it is possible to regulate the heat insulating performance of the storage container. Accordingly, in the storage container, it is possible to switch between a mode for reinforcing the heat insulating performance of the storage container and a mode for maintaining the usual heat insulating performance, depending on the change in outside air temperature, for example, due to change of the season or change in environment of installation location.

As described using the examples and the modification examples, according to the storage container of the invention, it is possible to effectively improve performance of the heat insulation between the outside of the storage container and the inside of the storage chamber when the temperature-controlled unit is stopped during power outage.

The scope of the invention is not limited to the embodiments, the examples and the modification examples described above. Furthermore, requirements described in the embodiments, the examples and the modification examples can be appropriately combined. Furthermore, one or more configuration elements described in the embodiments, the examples and the modification examples described above may not be used in some cases.

INDUSTRIAL APPLICABILITY

The present invention is widely applicable in the field of storage containers for storing a stored material at a temperature different from the ambient temperature.

REFERENCE SIGNS LIST 1A to 1D storage container
2 storage chamber
3 opening
4 container body
5 door member
6 temperature-controlled unit
14 first heat-insulating material
15 second heat-insulating material
16 heat-storage material
19 base material
20 exterior body
21 edge
28 third heat-insulating material

The invention claimed is:
1. A storage container comprising:
a container body having an opening;
a door member closing the opening in an openable and closable manner; and
a temperature-controlled unit having a function of making a temperature inside a storage chamber enclosed by the container body and the door member different from a temperature outside the storage chamber,
wherein the container body includes
a first heat-insulating material,
a second heat-insulating material which is provided partially on the opposite side to the storage chamber with respect to the first heat-insulating material and has thermal conductivity lower than thermal conductivity of the first heat-insulating material, and
a stationary heat-storage material which is continuously and fixedly provided at least partially in a region where the second heat-insulating material is not provided as viewed from a thickness direction of the first heat-insulating material on the same side as the storage chamber with respect to the first heat-insulating material and is formed of one or more kinds of raw material where phase transition is caused between a liquid phase and a solid phase at a temperature between the temperature outside the storage chamber and the temperature inside the storage chamber obtained by the function of the temperature-controlled unit.
2. The storage container according to claim 1,
wherein the heat-storage material is disposed from a first region which does not overlap the second heat-insulating material as viewed from the thickness direction of the first heat-insulating material to a second region which overlaps the second heat-insulating material across an edge of the second heat-insulating material.

3. The storage container according to claim 2,
wherein, a distance corresponding to an overlap amount from the edge of the second heat-insulating material to an edge of the heat-storage material as viewed from the thickness direction of the first heat-insulating material includes a distribution that is partially varied along an entirety of an outer periphery of the second heat-insulating material.

4. The storage container according claim 1,
wherein a thickness of the heat-storage material in a portion overlapping a vacuum heat-insulating material includes a distribution that is partially varied along an entirety of an outer periphery of the second heat-insulating material.

5. The storage container according to claim 1,
wherein the heat-storage material is formed by using plural kinds of raw material.

6. The storage container according to claim 2,
wherein the second region includes a region overlapping a portion where thermal conductivity in the thickness direction of the second heat-insulating material is larger than or equal to thermal conductivity in the thickness direction of the first heat-insulating material.

7. The storage container according to claim 2,
wherein the second region includes a region overlapping a portion where the thermal conductivity in the thickness direction of the second heat-insulating material is larger than or equal to 0.02 W/(m·K).

8. The storage container according to claim 2,
wherein the distance from the edge of the second heat-insulating material to the edge of the heat-storage material in the second region as viewed from the thickness direction of the first heat-insulating material is 20 mm or more.

9. The storage container according to claim 1,
wherein the heat-storage material is only disposed in a first region which does not overlap the second heat-insulating material as viewed from the thickness direction of the first heat-insulating material.

10. The storage container according to claim 2,
wherein a plurality of second heat-insulating materials are provided discretely, and
wherein the heat-storage material is continuously provided in the first region between a pair of second heat-insulating materials adjacent to each other in the plurality of second heat-insulating materials.

11. The storage container according to claim 2,
wherein the first region includes the whole of a region which does not overlap the second heat-insulating material as viewed from the thickness direction of the first heat-insulating material, in a region of the first heat-insulating material adjacent to the storage chamber.

12. The storage container according to claim 1,
wherein at least one of the heat-storage material and the second heat-insulating material is provided in an attachable and detachable manner.

13. The storage container according to claim 1, further comprising:
a third heat-insulating material provided on the same side as the storage chamber with respect to the first heat-insulating material.

14. The storage container according to claim 13,
wherein the third heat-insulating material is provided in an attachable and detachable manner.

15. The storage container according to claim 14,
wherein the heat-storage material is attachable and detachable integrally with the third heat-insulating material.

16. The storage container according to claim 13,
wherein the third heat-insulating material is formed of the same material as the second heat-insulating material.

17. The storage container according to claim 1,
wherein the thermal conductivity in the thickness direction of a peripheral portion including an outer periphery of the second heat-insulating material as viewed from the thickness direction of the second heat-insulating material is higher than thermal conductivity in the thickness direction of the center portion not including the outer periphery of the second heat-insulating material.

18. The storage container according to claim 1,
wherein the second heat-insulating material includes an exterior body in which a pressure in the inside thereof is reduced to be lower than the atmosphere and a base material accommodated inside the exterior body.

19. A storage container comprising:
a container body having an opening;
a door member closing the opening in an openable and closable manner; and
a temperature-controlled unit having a function of making a temperature inside a storage chamber enclosed by the container body and the door member be different from a temperature outside the storage chamber,
wherein the container body includes
a first heat-insulating material,
a third heat-insulating material which is provided partially on the same side as the storage chamber with respect to the first heat-insulating material and has thermal conductivity lower than thermal conductivity of the first heat-insulating material, and
a stationary heat-storage material which is continuously and fixedly provided at least partially in a region where the third heat-insulating material is not provided as viewed from a thickness direction of the first heat-insulating material on the same side as the storage chamber with respect to the first heat-insulating material and is formed of one or more kinds of raw material where phase transition is caused between a liquid phase and a solid phase at a temperature between the temperature outside the storage chamber and the temperature inside the storage chamber obtained by the function of the temperature-controlled unit.

20. The storage container according to claim 19,
wherein at least one of the heat-storage material and the third heat-insulating material is provided in an attachable and detachable manner.

21. The storage container according claim 2,
wherein a thickness of the heat-storage material in a portion overlapping a vacuum heat-insulating material includes a distribution that is partially varied along an entirety of an outer periphery of the second heat-insulating material.

22. The storage container according claim 3,
wherein a thickness of the heat-storage material in a portion overlapping a vacuum heat-insulating material includes a distribution that is partially varied along the entirety of the outer periphery of the second heat-insulating material.

23. The storage container according to claim 2,
wherein the heat-storage material is formed by using plural kinds of raw material.

24. The storage container according to claim 3,
wherein the heat-storage material is formed by using plural kinds of raw material.

25. The storage container according to claim 4,
wherein the heat-storage material is formed by using plural kinds of raw material.

* * * * *